(12) United States Patent
Files et al.

(10) Patent No.: US 9,522,499 B2
(45) Date of Patent: Dec. 20, 2016

(54) HEAT SEALING SYSTEMS AND METHODS, AND RELATED ARTICLES AND MATERIALS

(71) Applicant: Graphic Packaging International, Inc., Atlanta, GA (US)

(72) Inventors: John C. Files, Vancouver, WA (US); Scott Beckstrom, Vancouver, WA (US)

(73) Assignee: Graphic Packaging International, Inc., Atlanta, GA (US)

(*) Notice: Subject to any disclaimer, the term of this patent is extended or adjusted under 35 U.S.C. 154(b) by 131 days.

(21) Appl. No.: 14/448,374

(22) Filed: Jul. 31, 2014

(65) Prior Publication Data

US 2014/0338823 A1 Nov. 20, 2014

Related U.S. Application Data

(60) Division of application No. 12/776,507, filed on May 10, 2010, now Pat. No. 8,826,959, which is a
(Continued)

(51) Int. Cl.
*B29C 65/26* (2006.01)
*B29C 65/00* (2006.01)
(Continued)

(52) U.S. Cl.
CPC ......... *B29C 66/43121* (2013.01); *B29C 65/10* (2013.01); *B29C 65/7894* (2013.01); *B29C 66/8511* (2013.01); *B32B 5/022* (2013.01); *B32B 5/024* (2013.01); *B32B 5/22* (2013.01); *B32B 5/26* (2013.01); *B32B 7/12* (2013.01); *B32B 27/08* (2013.01); *B32B 27/10* (2013.01); *B32B 27/12* (2013.01); *B32B 27/308* (2013.01);
(Continued)

(58) Field of Classification Search
CPC ......... B29C 53/08; B29C 57/10; B65B 51/146
USPC ........... 53/429, 455, 482, 562, 374.7, 375.5; 156/227, 309.9, 282
See application file for complete search history.

(56) References Cited

U.S. PATENT DOCUMENTS

| 1,928,758 A | 10/1933 | Mairson et al. |
| 1,975,404 A | 10/1934 | Prucha |

(Continued)

FOREIGN PATENT DOCUMENTS

| CA | 2113244 | 1/1994 |
| DE | 1 461 247 | 1/1970 |

(Continued)

OTHER PUBLICATIONS

Declaration Regarding Prior Art executed by John C. Files on Jan. 22, 2013 in U.S. Appl. No. 12/776,507.*

(Continued)

*Primary Examiner* — Scott W Dodds
(74) *Attorney, Agent, or Firm* — Womble Carlyle Sandridge & Rice, LLP

(57) ABSTRACT

A bag may be formed from a tube of high strength packaging material by forming a heat seal in the end of the tube. As part of forming the heat seal, one or more supplying apparatuses, which may be air outlets, are positioned for being in opposing face-to-face relation with, and for causing heat transfer with, at least one outer portion of the tube while a transportation system transports the tube to a nipping apparatus.

18 Claims, 18 Drawing Sheets

Related U.S. Application Data continuation-in-part of application No. 12/616,371, filed on Nov. 11, 2009, now abandoned, which is a continuation-in-part of application No. 11/824,175, filed on Jun. 28, 2007, now abandoned.

(60) Provisional application No. 60/817,488, filed on Jun. 29, 2006, provisional application No. 61/247,983, filed on Oct. 2, 2009, provisional application No. 61/278,060, filed on Oct. 2, 2009.

(51) Int. Cl.

| | | |
|---|---|---|
| *B32B 27/32* | (2006.01) | |
| *B29C 65/10* | (2006.01) | |
| *B29C 65/78* | (2006.01) | |
| *B32B 5/02* | (2006.01) | |
| *B32B 5/22* | (2006.01) | |
| *B32B 5/26* | (2006.01) | |
| *B32B 7/12* | (2006.01) | |
| *B32B 27/08* | (2006.01) | |
| *B32B 27/10* | (2006.01) | |
| *B32B 27/12* | (2006.01) | |
| *B32B 27/30* | (2006.01) | |
| *B32B 27/36* | (2006.01) | |
| *B32B 29/00* | (2006.01) | |
| B29K 23/00 | (2006.01) | |
| B29K 105/00 | (2006.01) | |
| B29K 105/04 | (2006.01) | |
| B29L 9/00 | (2006.01) | |

(52) U.S. Cl.
CPC .......... *B32B 27/32* (2013.01); *B32B 27/327* (2013.01); *B32B 27/36* (2013.01); *B32B 29/005* (2013.01); *B29K 2023/0625* (2013.01); *B29K 2023/0633* (2013.01); *B29K 2023/08* (2013.01); *B29K 2023/12* (2013.01); *B29K 2105/0088* (2013.01); *B29K 2105/04* (2013.01); *B29K 2995/0053* (2013.01); *B29K 2995/0063* (2013.01); *B29K 2995/0097* (2013.01); *B29L 2009/00* (2013.01); *B32B 2262/02* (2013.01); *B32B 2262/0253* (2013.01); *B32B 2270/00* (2013.01); *B32B 2307/31* (2013.01); *B32B 2307/50* (2013.01); *B32B 2307/518* (2013.01); *B32B 2307/54* (2013.01); *B32B 2307/5825* (2013.01); *B32B 2307/718* (2013.01); *B32B 2307/7244* (2013.01); *B32B 2307/7246* (2013.01); *B32B 2307/7265* (2013.01); *B32B 2307/75* (2013.01); *B32B 2439/06* (2013.01); *B32B 2439/46* (2013.01); *B32B 2553/00* (2013.01); *Y10T 156/1015* (2015.01); *Y10T 156/1051* (2015.01)

(56) References Cited

U.S. PATENT DOCUMENTS

| | | |
|---|---|---|
| 2,146,831 A | 2/1939 | Maxfield |
| 2,339,304 A | 1/1944 | Von Haase |
| 2,941,894 A | 6/1960 | McAdow |
| 3,018,189 A | 1/1962 | Traver |
| 3,196,038 A | 7/1965 | Schoch et al. |
| 3,364,056 A | 1/1968 | Seibel |
| 3,394,871 A | 7/1968 | Williams et al. |
| 3,462,070 A | 8/1969 | Corella |
| 3,463,659 A | 8/1969 | Dragoon et al. |
| 3,653,894 A | 4/1972 | Levy et al. |
| 3,807,626 A | 4/1974 | Goodrich |
| 3,863,835 A | 2/1975 | Gendron |
| 3,873,345 A | 3/1975 | Vreeland |
| RE28,554 E | 9/1975 | Curler et al. |
| 3,910,488 A | 10/1975 | Goodrich |
| 3,936,383 A | 2/1976 | Daimon et al. |
| 4,003,311 A | 1/1977 | Bardin |
| 4,015,085 A | 3/1977 | Woods |
| 4,072,769 A | 2/1978 | Lidel |
| 4,166,054 A | 8/1979 | Meeske et al. |
| 4,173,480 A | 11/1979 | Woodward |
| 4,173,558 A | 11/1979 | Beck |
| 4,181,567 A | 1/1980 | Riddell et al. |
| 4,233,195 A | 11/1980 | Mills |
| 4,239,519 A | 12/1980 | Beall et al. |
| 4,265,969 A | 5/1981 | Yasuda et al. |
| 4,282,059 A | 8/1981 | Davidson |
| 4,301,210 A | 11/1981 | Yasuda et al. |
| 4,336,306 A | 6/1982 | Fellows |
| 4,343,858 A | 8/1982 | Thompson |
| 4,371,596 A | 2/1983 | Sheibley |
| 4,373,979 A | 2/1983 | Planeta |
| 4,375,989 A | 3/1983 | Markinen |
| 4,391,833 A | 7/1983 | Self et al. |
| 4,401,256 A | 8/1983 | Krieg |
| 4,410,578 A | 10/1983 | Miller et al. |
| 4,455,184 A | 6/1984 | Thompson |
| 4,471,904 A | 9/1984 | Cassidy |
| 4,490,960 A | 1/1985 | Klemesrud |
| 4,493,685 A | 1/1985 | Blamer |
| 4,521,492 A | 6/1985 | Allen |
| 4,568,574 A | 2/1986 | Allen |
| 4,587,154 A | 5/1986 | Hotchkiss et al. |
| 4,595,611 A | 6/1986 | Quick et al. |
| 4,608,259 A | 8/1986 | Cortopassi |
| 4,613,542 A | 9/1986 | Alexander |
| 4,618,992 A | 10/1986 | LaGrotteria |
| 4,735,308 A | 4/1988 | Barner |
| 4,739,003 A | 4/1988 | Barr et al. |
| 4,744,466 A | 5/1988 | Hall |
| 4,749,444 A | 6/1988 | Lorz et al. |
| 4,757,930 A | 7/1988 | Ditto |
| 4,762,643 A | 8/1988 | Bohrn et al. |
| 4,775,586 A | 10/1988 | Bohrn et al. |
| 4,775,771 A | 10/1988 | Pawlowski |
| 4,781,317 A | 11/1988 | Ditto |
| 4,786,558 A | 11/1988 | Sumiya et al. |
| 4,854,971 A | 8/1989 | Gane et al. |
| 4,865,921 A | 9/1989 | Hollenberg |
| 4,867,844 A | 9/1989 | Dessauer |
| 4,868,048 A | 9/1989 | Barr et al. |
| 4,890,439 A | 1/1990 | Smart |
| 4,913,773 A | 4/1990 | Knudsen et al. |
| 4,933,212 A | 6/1990 | Gerstner et al. |
| 4,935,276 A | 6/1990 | Pawlowski et al. |
| 4,936,935 A | 6/1990 | Beckett |
| 4,953,708 A | 9/1990 | Beer et al. |
| 4,954,356 A | 9/1990 | Kappes |
| 4,963,424 A | 10/1990 | Beckett |
| 4,982,064 A | 1/1991 | Hartman et al. |
| 4,984,907 A | 1/1991 | Power |
| 4,988,561 A | 1/1991 | Wason |
| 5,015,334 A | 5/1991 | Derrick |
| 5,023,227 A | 6/1991 | Matoba et al. |
| 5,029,521 A | 7/1991 | Pav et al. |
| 5,032,227 A | 7/1991 | Derrick et al. |
| 5,037,682 A | 8/1991 | Gerstner et al. |
| 5,041,325 A | 8/1991 | Larson |
| 5,070,067 A | 12/1991 | Tani et al. |
| 5,071,512 A | 12/1991 | Bixler et al. |
| 5,089,320 A | 2/1992 | Straus et al. |
| 5,091,236 A | 2/1992 | Keller et al. |
| 5,092,516 A | 3/1992 | Kastanek |
| 5,093,364 A | 3/1992 | Richards |
| 5,094,863 A | 3/1992 | Vandenburg |
| 5,100,934 A | 3/1992 | Glesias |
| 5,117,078 A | 5/1992 | Beckett |
| 5,124,519 A | 6/1992 | Roy |
| 5,128,182 A | 7/1992 | Bunker et al. |
| 5,143,546 A | 9/1992 | Yuasa et al. |
| 5,169,496 A | 12/1992 | Wagle et al. |

(56) References Cited

U.S. PATENT DOCUMENTS

| | | |
|---|---|---|
| 5,175,031 A | 12/1992 | Ochocki |
| 5,178,730 A | 1/1993 | Bixler et al. |
| 5,192,613 A | 3/1993 | Work, III et al. |
| 5,194,120 A | 3/1993 | Peats et al. |
| 5,198,490 A | 3/1993 | Berg et al. |
| 5,199,792 A | 4/1993 | Roosa |
| 5,213,902 A | 5/1993 | Beckett |
| 5,221,419 A | 6/1993 | Beckett |
| 5,223,098 A | 6/1993 | Cluyse et al. |
| 5,223,311 A | 6/1993 | Tsutsumi et al. |
| 5,231,068 A | 7/1993 | Miyamoto et al. |
| 5,240,777 A | 8/1993 | Wacher |
| 5,252,445 A | 10/1993 | Timmerman et al. |
| 5,260,537 A | 11/1993 | Beckett |
| 5,266,386 A | 11/1993 | Beckett |
| 5,310,587 A | 5/1994 | Akahori et al. |
| RE34,683 E | 8/1994 | Maynard |
| 5,335,996 A | 8/1994 | Cortopassi et al. |
| 5,340,436 A | 8/1994 | Beckett |
| 5,346,312 A | 9/1994 | Mabry et al. |
| 5,354,973 A | 10/1994 | Beckett |
| 5,360,643 A | 11/1994 | Wacher |
| 5,376,392 A | 12/1994 | Ikegami et al. |
| 5,384,295 A | 1/1995 | McWhinnie et al. |
| 5,385,771 A | 1/1995 | Willetts et al. |
| 5,399,366 A | 3/1995 | Geddes et al. |
| 5,407,480 A | 4/1995 | Payton et al. |
| 5,410,135 A | 4/1995 | Pollart |
| 5,414,248 A | 5/1995 | Phillips et al. |
| 5,415,340 A | 5/1995 | Calvert et al. |
| 5,423,911 A | 6/1995 | Coutelle et al. |
| 5,424,517 A | 6/1995 | Habeger |
| 5,429,867 A | 7/1995 | McCarthy et al. |
| 5,454,955 A | 10/1995 | Albrecht et al. |
| 5,491,013 A | 2/1996 | Holley |
| 5,494,738 A | 2/1996 | Van Thillo et al. |
| 5,519,195 A | 5/1996 | Keefer |
| 5,552,002 A | 9/1996 | Farrell et al. |
| 5,603,996 A | 2/1997 | Overcash et al. |
| 5,609,901 A | 3/1997 | Geddes et al. |
| 5,628,921 A | 5/1997 | Beckett |
| 5,632,404 A | 5/1997 | Walsh |
| 5,672,407 A | 9/1997 | Beckett |
| 5,728,416 A | 3/1998 | Bono et al. |
| 5,759,422 A | 6/1998 | Schmelzer |
| 5,766,732 A | 6/1998 | Claytor |
| 5,799,978 A | 9/1998 | Grinnell |
| 5,800,724 A | 9/1998 | Habeger |
| 5,837,383 A | 11/1998 | Wenzel et al. |
| 5,858,153 A * | 1/1999 | Mack .................. B29C 65/18 156/201 |
| 5,868,567 A | 2/1999 | Abe et al. |
| 5,882,746 A | 3/1999 | Hoffman |
| 5,928,741 A | 7/1999 | Andersen et al. |
| 5,935,697 A | 8/1999 | Gasse et al. |
| 5,989,696 A | 11/1999 | McCarthy et al. |
| 6,096,384 A | 8/2000 | Calvert |
| 6,114,679 A | 9/2000 | Lai |
| 6,120,860 A | 9/2000 | Bowen et al. |
| 6,150,646 A | 11/2000 | Lai |
| 6,179,467 B1 * | 1/2001 | Derby .................. B29C 66/61 383/113 |
| 6,204,492 B1 | 3/2001 | Zeng |
| 6,207,242 B1 | 3/2001 | Hoffman |
| 6,210,776 B1 | 4/2001 | Hill |
| 6,251,451 B1 | 6/2001 | Zeng |
| 6,284,034 B1 | 9/2001 | Hiorns et al. |
| 6,312,742 B1 | 11/2001 | Wood et al. |
| 6,387,500 B1 | 5/2002 | Behl |
| 6,414,290 B1 | 7/2002 | Cole |
| 6,433,322 B2 | 8/2002 | Zeng |
| 6,437,046 B1 | 8/2002 | Morris |
| 6,455,827 B2 | 9/2002 | Zeng |
| 6,526,726 B1 * | 3/2003 | Strand .................. B31B 19/90 156/66 |
| 6,534,171 B1 | 3/2003 | Eggers |
| 6,552,315 B2 | 4/2003 | Zeng |
| 6,574,946 B1 * | 6/2003 | Linner .................. B29B 13/025 53/167 |
| 6,576,329 B2 | 6/2003 | Kong |
| 6,669,814 B2 | 12/2003 | Hansen et al. |
| 6,677,563 B2 | 1/2004 | Lai |
| 6,680,103 B1 | 1/2004 | Sloat et al. |
| 6,717,121 B2 | 4/2004 | Zeng |
| 6,765,182 B2 | 7/2004 | Cole |
| 6,777,067 B1 | 8/2004 | Speith-Herfurth et al. |
| 6,787,205 B1 | 9/2004 | Aho et al. |
| 6,800,051 B2 | 10/2004 | Koehn |
| 6,858,252 B2 | 2/2005 | Sloat et al. |
| 6,893,686 B2 | 5/2005 | Egan |
| 7,291,370 B2 | 11/2007 | Gipson et al. |
| 7,635,736 B2 | 12/2009 | Lenges et al. |
| 7,731,425 B2 | 6/2010 | Lin et al. |
| 8,104,959 B2 | 1/2012 | Lucas et al. |
| 8,486,500 B2 | 7/2013 | Austreng et al. |
| 8,753,012 B2 | 6/2014 | Files |
| 8,826,959 B2 | 9/2014 | Files |
| 2002/0028336 A1 | 3/2002 | Jaccoud |
| 2002/0114933 A1 | 8/2002 | Gould |
| 2002/0132071 A1 | 9/2002 | Buongiorno |
| 2003/0064181 A1 | 4/2003 | Ingraham |
| 2003/0091847 A1 | 5/2003 | Hawes et al. |
| 2003/0166368 A1 | 9/2003 | Bushman et al. |
| 2003/0226648 A1 | 12/2003 | McDonnell et al. |
| 2003/0232161 A1 | 12/2003 | Lin et al. |
| 2004/0016216 A1 | 1/2004 | Romagnoli |
| 2004/0023000 A1 | 2/2004 | Young et al. |
| 2004/0053066 A1 | 3/2004 | Cretekos et al. |
| 2004/0101661 A1 | 5/2004 | Sloat et al. |
| 2004/0105600 A1 | 6/2004 | Floyd |
| 2004/0105941 A1 | 6/2004 | Terada et al. |
| 2004/0175465 A1 | 9/2004 | Buelow et al. |
| 2005/0037162 A1 | 2/2005 | Adams |
| 2005/0084185 A1 | 4/2005 | Moon |
| 2005/0158524 A1 | 7/2005 | Sloat et al. |
| 2005/0203249 A1 | 9/2005 | Lenges et al. |
| 2005/0272585 A1 | 12/2005 | Allen et al. |
| 2005/0276525 A1 | 12/2005 | Hebert et al. |
| 2006/0014022 A1 | 1/2006 | Kendig et al. |
| 2006/0049190 A1 | 3/2006 | Middleton |
| 2006/0233985 A1 | 10/2006 | Pockat et al. |
| 2006/0269173 A1 | 11/2006 | Koehn |
| 2007/0000568 A1 | 1/2007 | Bohme et al. |
| 2007/0140600 A1 | 6/2007 | Nowak et al. |
| 2007/0166512 A1 | 7/2007 | Jesch et al. |
| 2007/0274614 A1 | 11/2007 | Abel |
| 2007/0292569 A1 | 12/2007 | Bohme et al. |
| 2008/0085065 A1 | 4/2008 | Nowak et al. |
| 2008/0187695 A1 | 8/2008 | Nowak et al. |
| 2008/0292223 A1 | 11/2008 | Bannister |
| 2010/0098355 A1 | 4/2010 | Jansen |
| 2010/0120313 A1 | 5/2010 | Bohme et al. |
| 2010/0150479 A1 | 6/2010 | Smith |
| 2010/0263332 A1 | 10/2010 | Files et al. |
| 2010/0270309 A1 | 10/2010 | Files et al. |
| 2010/0273017 A1 | 10/2010 | Files |
| 2010/0273377 A1 | 10/2010 | Files et al. |
| 2011/0013859 A1 | 1/2011 | Koehn |
| 2011/0230323 A1 | 9/2011 | Robinette et al. |
| 2011/0255807 A1 | 10/2011 | Shapiro et al. |
| 2012/0070105 A1 | 3/2012 | Abel |

FOREIGN PATENT DOCUMENTS

| | | |
|---|---|---|
| EP | 0 271 268 A2 | 6/1988 |
| EP | 0 313 356 A2 | 4/1989 |
| EP | 0 743 258 | 11/1996 |
| EP | 1 092 526 A1 | 4/2001 |
| GB | 1 083 357 | 9/1967 |
| GB | 1 103 466 | 2/1968 |
| GB | 1 546 607 | 5/1979 |
| JP | 54-50575 | 4/1979 |
| JP | 03169540 A | 7/1991 |
| JP | 04080745 A | 3/1992 |

(56) References Cited

FOREIGN PATENT DOCUMENTS

| JP | 05-147664 A | 6/1993 |
|---|---|---|
| JP | 2001-048126 A | 2/2001 |
| KR | 2001-0069849 A | 7/2001 |
| WO | WO 96/15321 A1 | 5/1996 |
| WO | WO 99/44909 A1 | 9/1999 |
| WO | WO 00/77300 A1 | 12/2000 |
| WO | WO 01/05671 A1 | 1/2001 |
| WO | WO 03/66435 A2 | 8/2003 |
| WO | WO 2007/002896 A2 | 1/2007 |
| WO | WO 2008/003025 A2 | 1/2008 |
| WO | WO 2011/040992 | 4/2011 |
| WO | WO 2011/040993 | 4/2011 |
| WO | WO 2011/040994 | 4/2011 |

OTHER PUBLICATIONS

Stonepak, Premier Tech Systems, "Model 92-I, Pinch Bottom Bag Sealer / Closer", http://www.stonepak.com/content/products/6/2.shtml, at least as early as May 6, 2010.
Stonepak, Premier Tech Systems, "Product Brochure—Model 92-I, Pinch Bottom Bag Sealer / Closer", at least as early as May 6, 2010.
Stonepak, Premier Tech Systems, "90-I Pinch Bottom Bag Closer", http://www.stonepak.com/content/products/6/1.shtml, at least as early as May 6, 2010.
Stonepak, Premier Tech Systems, "Product Brochure—90-I Pinch Bottom Bag Closer", at least as early as May 6, 2010.
Declaration of John C. Files dated Aug. 30, 2010.
Final Office Action dated Jan. 7, 2013 in U.S. Appl. No. 12/616,371.
Request for Continued Examination and Amendment filed Apr. 8, 2013 in U.S. Appl. No. 12/616,371.
Final Office Action dated Dec. 6, 2012 in U.S. Appl. No. 12/776,468.
Request for Continued Examination and Amendment filed Apr. 8, 2013 in U.S. Appl. No. 12/776,468.
Amendment filed Jan. 3, 2013 in U.S. Appl. No. 12/776,483.
Final Office Action dated Mar. 26, 2013 in U.S. Appl. No. 12/776,483.
Amendment filed Apr. 8, 2013 in U.S. Appl. No. 12/776,494.
Office Action issued Dec. 5, 2011 in U.S. Appl. No. 12/616,371.
Response filed Dec. 19, 2011 in U.S. Appl. No. 12/616,371.
Office Action issued Jan. 23, 2011 in U.S. Appl. No. 12/616,371.
Response filed Mar. 26, 2012 in U.S. Appl. No. 12/616,371.
Office Action issued Jun. 14, 2012 in U.S. Appl. No. 12/616,371.
Response filed Sep. 13, 2012 in U.S. Appl. No. 12/616,371.
Office Action issued Jun. 22, 2012 in U.S. Appl. No. 12/776,483.
Response filed Jul. 17, 2012 in U.S. Appl. No. 12/776,483.
Office Action issued Mar. 22, 2012 in U.S. Appl. No. 12/776,468.
Response filed Apr. 19, 2012 in U.S. Appl. No. 12/776,468.
Office Action issued Aug. 3, 2012 in U.S. Appl. No. 12/776,468.
International Search Report and Written Opinion for International Application No. PCT/US2007/072329 dated Feb. 12, 2008.
International Search Report and Written Opinion for International Application No. PCT/US2006/025557 dated May 7, 2007.
Maier, Clive et al., "Propylene: The Definitive User's Guide and Databook," 1998, Plastics Design Library, pp. 57-58.
Non-final Office Action dated Feb. 14, 2013 in U.S. Appl. No. 12/776,494.
International Search Report—PCT/US2010/034179 dated Feb. 1, 2011.
Written Opinion—PCT/US2010/034179 dated Feb. 1, 2011.
International Search Report—PCT/US2010/034181 dated Jan. 20, 2011.
Written Opinion—PCT/US2010/034181 dated Jan. 20, 2011.
International Search Report—PCT/US2010/034184 dated Dec. 29, 2010.
Written Opinion—PCT/US2010/034184 dated Dec. 29, 2010.
Declaration Regarding Prior Art executed by John C. Files on Jan. 22, 2013.
Response filed Oct. 31, 2012 in U.S. Appl. No. 12/776,468.
Office Action dated Oct. 5, 2012 in U.S. Appl. No. 12/776,483.
International Search Report—PCT/US2005/30231 dated Feb. 15, 2006.
Written Opinion—PCT/US2005/30231 dated Feb. 15, 2006.
Peacock, Andrew J., Handbook of Polyethylene: Structures, Properties, and Applications, New York: Marcel Dekker, 2000, p. 519, ISBN 0-8247-9546-6.
Definition of "Film", <http://www.google.com/search?q=define%3A+film&sourceid=1e7&ris=com.microsoft:en, printed Nov. 27, 2012>.
Office Action dated May 4, 2012 in U.S. Appl. No. 12/776,507.
Response to Restriction Requirement dated May 25, 2012 in U.S. Appl. No. 12/776,507.
Office Action dated Jun. 14, 2012 in U.S. Appl. No. 12/776,507.
Amendment and Response dated Sep. 14, 2012 in U.S. Appl. No. 12/776,507.
Office Action dated Oct. 25, 2012 in U.S. Appl. No. 12/776,507.
Request for Continued Examination (RCE) Transmittal dated Jan. 25, 2013 in U.S. Appl. No. 12/776,507.
Amendment Under 37 C.F.R. § 1.114 dated Jan. 25, 2013 in U.S. Appl. No. 12/776,507.
Office Action dated Dec. 18, 2013 in U.S. Appl. No. 12/776,507.
Amendment and Response to Office Action dated Mar. 18, 2014 in U.S. Appl. No. 12/776,507.
Notice of Allowance and Fee(s) Due dated May 1, 2014 in U.S. Appl. No. 12/776,507.
Supplemental Notice of Allowability dated Jun. 24, 2014 in U.S. Appl. No. 12/776,507.
Part B—Fee(s) Transmittal dated Jul. 31, 2014 in U.S. Appl. No. 12/776,507.
Issue Notification dated Aug. 20, 2014 in U.S. Appl. No. 12/776,507.
Office Action dated Mar. 13, 2014 in U.S. Appl. No. 12/616,371.
Amendment and Response dated Jun. 12, 2014 in U.S. Appl. No. 12/616,371.
Office Action dated Sep. 15, 2014 in U.S. Appl. No. 12/616,371.
Office Action dated Oct. 1, 2008 in U.S. Appl. No. 11/824,175.
Response to Restriction Requirement dated Oct. 22, 2008 in U.S. Appl. No. 11/824,175.
Office Action dated Dec. 23, 2008 in U.S. Appl. No. 11/824,175.
Response to Office Action and Amendment Pursuant to 37 C.F.R. § 1.111 dated Mar. 19, 2009 in U.S. Appl. No. 11/824,175.
Office Action dated May 14, 2009 in U.S. Appl. No. 11/824,175.
Response to Office Action dated Nov. 12, 2009 in U.S. Appl. No. 11/824,175.
Advisory Action dated Dec. 2, 2009 in U.S. Appl. No. 11/824,175.
Office Action dated Feb. 13, 2014 in U.S. Appl. No. 12/776,468.
Response to Office Action and Amendment dated May 13, 2014 in U.S. Appl. No. 12/776,468.
Office Action dated May 29, 2014 in U.S. Appl. No. 12/776,468.
Request for Continued Examination (RCE) Transmittal dated Jun. 25, 2013 in U.S. Appl. No. 12/776,483.
Response to Office Action and Amendment dated Jun. 25, 2013 in U.S. Appl. No. 12/776,483.
Office Action dated Oct. 11, 2013 in U.S. Appl. No. 12/776,483.
Response to Office Action and Amendment dated Dec. 26, 2013 in U.S. Appl. No. 12/776,483.
Notice of Allowance and Fee(s) Due dated 01/72/2014 in U.S. Appl. No. 12/776,483.
Supplemental Notice of Allowability dated Apr. 15, 2014 in U.S. Appl. No. 12/776,483.
Part B—Fee(s) Transmittal dated Apr. 23, 2014 in U.S. Appl. No. 12/776,483.
Supplemental Notice of Allowability dated May 2, 2014 in U.S. Appl. No. 12/776,483.
Issue Notification dated May 28, 2014 in U.S. Appl. No. 12/776,483.
Office Action dated Aug. 1, 2013 in U.S. Appl. No. 12/776,494.
Request for Continued Examination (RCE) Transmittal dated Nov. 26, 2013 in U.S. Appl. No. 12/776,494.

(56) References Cited

OTHER PUBLICATIONS

Request for Continued Examination and Amendment Pursuant to 37 C.F.R. § 1.114 in U.S. Appl. No. 12/776,494, dated Nov. 26, 2013.

* cited by examiner

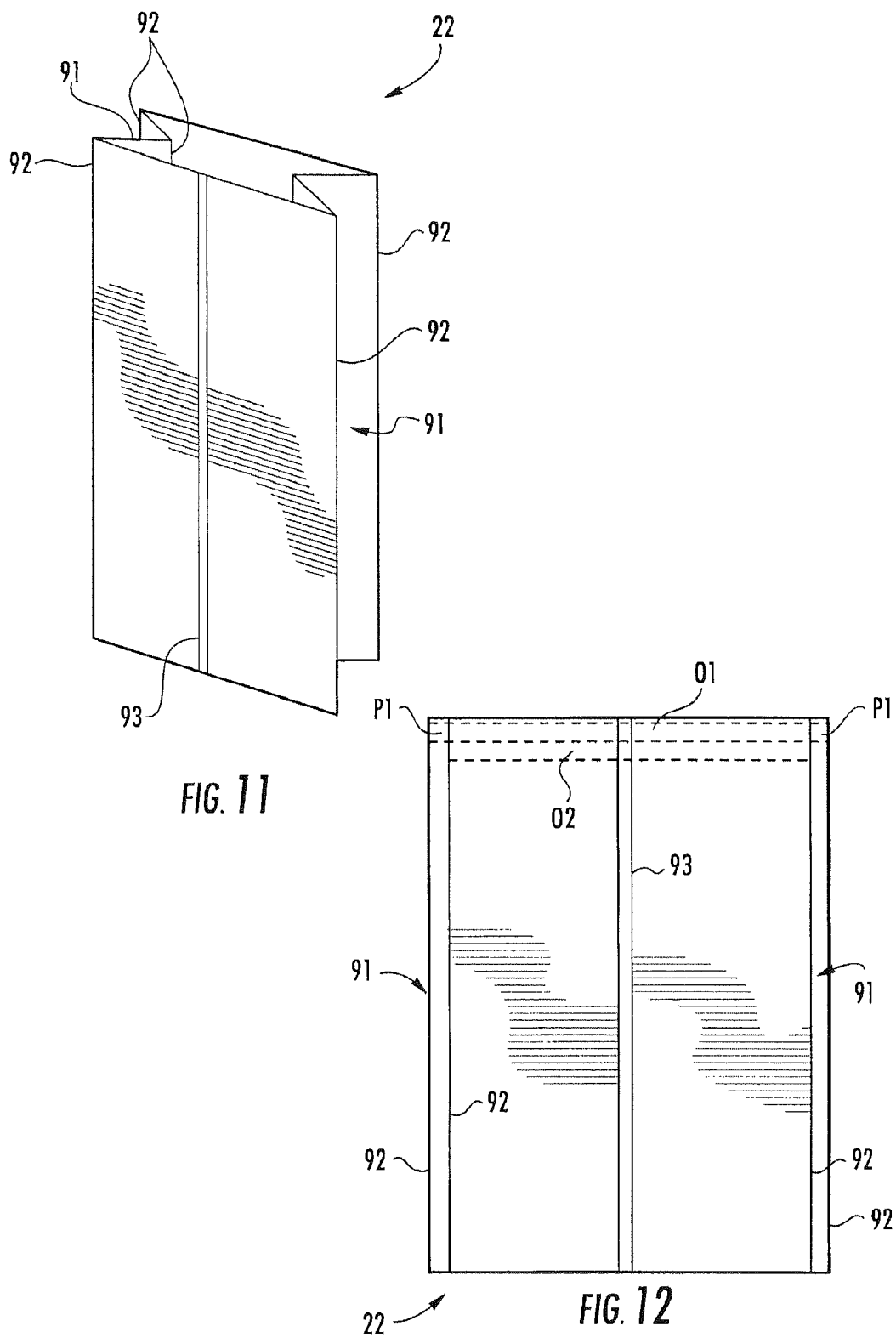

HEAT SEALING SYSTEMS AND METHODS, AND RELATED ARTICLES AND MATERIALS

CROSS-REFERENCE TO RELATED APPLICATIONS

The present application is a divisional of U.S. patent application Ser. No. 12/776,507, filed May 10, 2010, which is a continuation-in-part of U.S. patent application Ser. No. 12/616,371, filed Nov. 11, 2009, which is a continuation-in-part of U.S. patent application Ser. No. 11/824,175, filed Jun. 28, 2007, now abandoned. U.S. patent application Ser. No. 11/824,175, filed Jun. 28, 2007, claims the benefit of U.S. Provisional Application No. 60/817,488, filed Jun. 29, 2006. U.S. patent application Ser. No. 12/776,507 also claims the benefit of U.S. Provisional Application No. 61/247,983, filed Oct. 2, 2009, and U.S. Provisional Application No. 61/278,060, filed Oct. 2, 2009. Each of the above applications is incorporated by reference in its entirety.

TECHNICAL FIELD

This disclosure relates to heat sealing systems and methods and, more particularly, to using heat to close an end of a tube to form a bag.

BACKGROUND OF THIS DISCLOSURE

It is well known to form bags from tubes, by closing ends of the tubes. Sometimes a tube is formed from a heat sealable material, and heat is used to form a seal that closes an end of the tube. As a contrasting example, sometimes the end of a tube is sewn closed to form a bag, such as when the tube is constructed of a material that is not heat sealable, or in other circumstances in which a suitable heat seal may not be formed (e.g., in tubes constructed of high strength packaging material). In some situations, a heat seal is considered superior to a sewn seal. Accordingly, it is desirable to provide improvements that promote the usage of heat seals (e.g., in some tubes constructed of high strength packaging material).

SUMMARY OF SOME ASPECTS OF THIS DISCLOSURE

One aspect of this disclosure is the provision of improvements to a system for sealing a tube to form a bag. A tube typically has opposite first and second sides that each extend between opposite ends of the tube. The opposite ends of the tubes may be "straight cut" (e.g., at least substantially straight cut (i.e., not step cut)). The first side of the tube includes a first outer portion of the tube and a second outer portion of the tube, and the second side of the tube includes a third outer portion of the tube and a fourth outer portion of the tube. The tube may be at least partially constructed of a woven polymer material.

In accordance with one aspect, the system includes a transportation system for transporting the tube in a downstream direction along a path. A folding apparatus is positioned along the path for moving the first and third outer portions of the tube relative to the second and fourth outer portions of the tube and, thereby, folding the tube into a folded-over configuration while the transportation system transports the tube proximate the folding apparatus. In the folded-over configuration, the first and second outer portions of the tube are facing substantially toward one another, and the third and fourth outer portions of the tube are facing substantially away from one another. A supplying apparatus (e.g., air outlet) is positioned along the path for being in opposing face-to-face relation with, and for causing heat transfer with, at least one outer portion of the tube while the transportation system transports the tube proximate the supplying apparatus. The at least one outer portion of the tube is selected from the group consisting of the second outer portion of the tube, the third outer portion of the tube, and the fourth outer portion of the tube. A nipping apparatus is positioned downstream from both the folding apparatus and the supplying apparatus along the path, for receiving the at least partially heated tube in the folded-over configuration from the transportation system. The nipping apparatus is for nipping at least the first, second, third and fourth outer portions of the tube while the tube is in the folded-over configuration. The nipping typically completes the folding and the forming of the seal(s).

In accordance with one aspect, the supplying apparatus comprises an air outlet mounted for being in opposing face-to-face relation with the at least one outer portion of the tube while the transportation system transports the tube proximate the air outlet. The air outlet is for discharging air onto the at least one outer portion of the tube while the transportation system transports the tube proximate the air outlet, so that forced convection causes heat transfer with the at least one outer portion of the tube.

In accordance with one aspect of this disclosure, a system for sealing a tube includes a transportation system for transporting the tube in a downstream direction along a path. A first supplying apparatus (e.g., air outlet) is positioned along the path for being in opposing face-to-face relation with, and for causing heat transfer with, a first outer portion of the tube while the transportation system transports the tube proximate the first supplying apparatus. A second supplying apparatus (e.g., air outlet) is positioned along the path for being in opposing face-to-face relation with, and for causing heat transfer with, a second outer portion of the tube while the transportation system transports the tube proximate the second supplying apparatus. The first and second supplying apparatuses are opposite from one another, and the first and second outer portions of the tube are opposite from one another. A nipping apparatus is positioned downstream from both the first and second supplying apparatuses, for receiving the tube from the transportation system and completing the folding and the forming of the seal(s).

Other aspects and advantages of the present disclosure will become apparent from the following.

BRIEF DESCRIPTION OF THE DRAWINGS

Having described some aspects of this disclosure in general terms, reference will now be made to the accompanying drawings, which are not necessarily drawn to scale, and wherein:

FIG. 11 is an isolated, front, top perspective view of the tube in isolation prior to having either of its ends sealed, with the tube being slightly open and having its right and left side pleats folded inwardly, in accordance with the first embodiment.

FIG. 12 is a schematic, front elevation view of the tube of FIG. 11, with the side pleats folded outwardly and the tube in a flattened configuration.

DETAILED DESCRIPTION

Referring now in greater detail to the drawings, in which like numerals refer to like parts throughout the several views, a sealing system 20 is disclosed in the following, in accordance with a first embodiment of this disclosure. In accordance with the first embodiment, the sealing system 20 may be like conventional closers systems that are available as Model 90-I and Model 92-I from Stonepak by Premier Tech Systems, of Salt Lake City, Utah, except for variations noted in this disclosure and variations that will be apparent to one of ordinary skill in the art.

Figure 15:
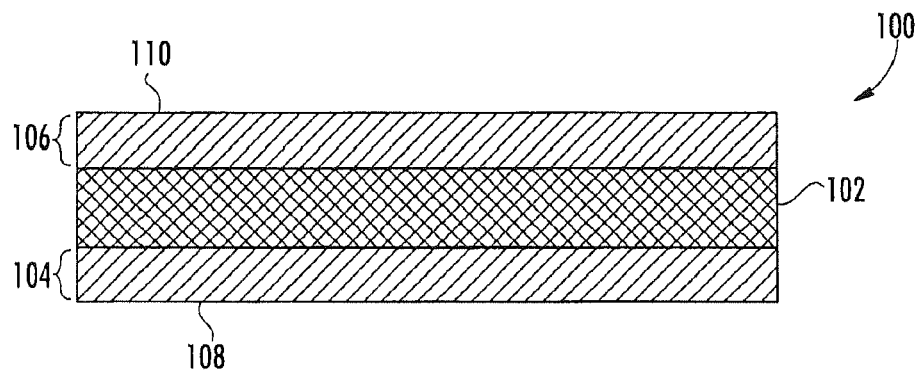
FIG. 15 is an isolated, schematic, cross-sectional view of a portion of an exemplary packaging material from which the tube to be processed by the sealing system may be constructed, in accordance with the first embodiment.
Figure 16:
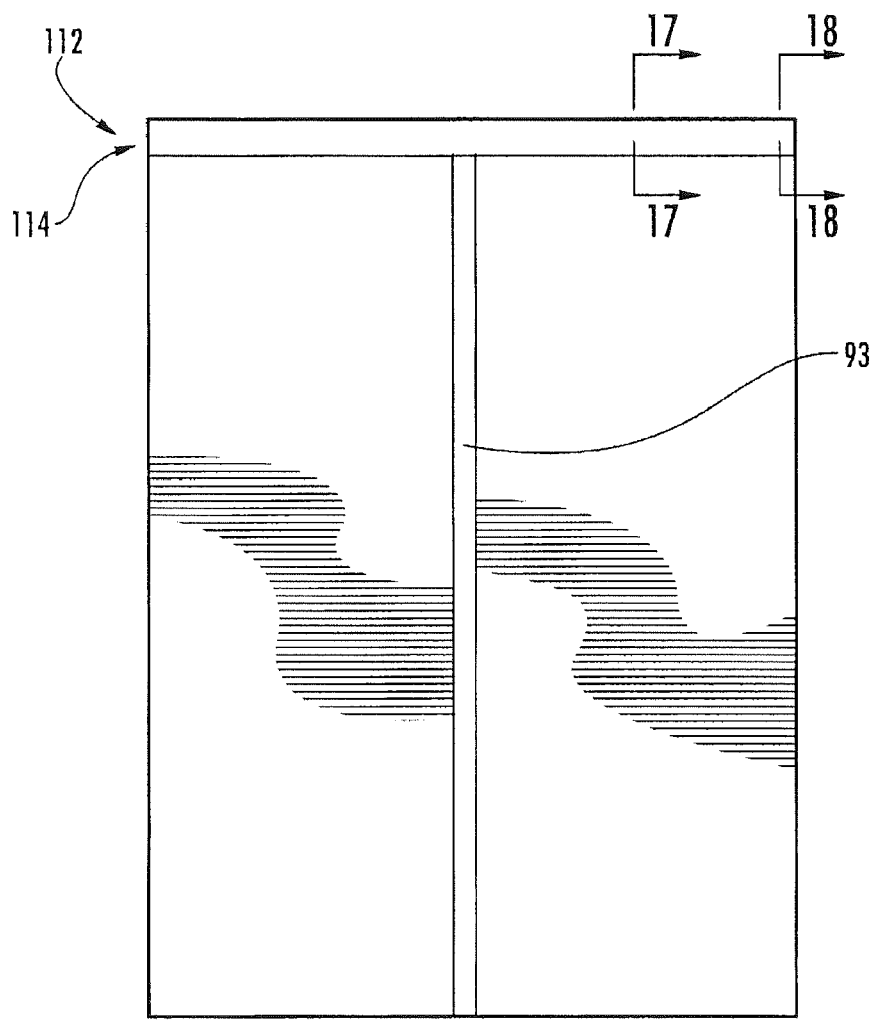
FIG. 16 is a schematic, front elevation view of the bag formed from the tube by the sealing system, in accordance with the first embodiment.
Figure 17:
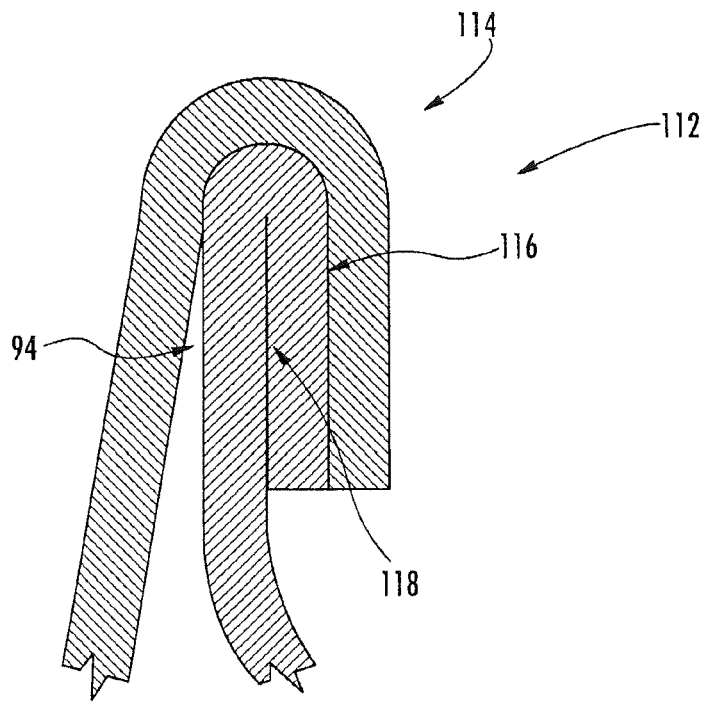
FIG. 17 is a schematic cross-sectional view of a top portion of the bag of FIG. 16, with the cross section taken along line 17-17 of FIG. 16, only the cross-section being shown, and the bag not being entirely flattened, so that a portion of the interior of the bag is shown.
Figure 18:
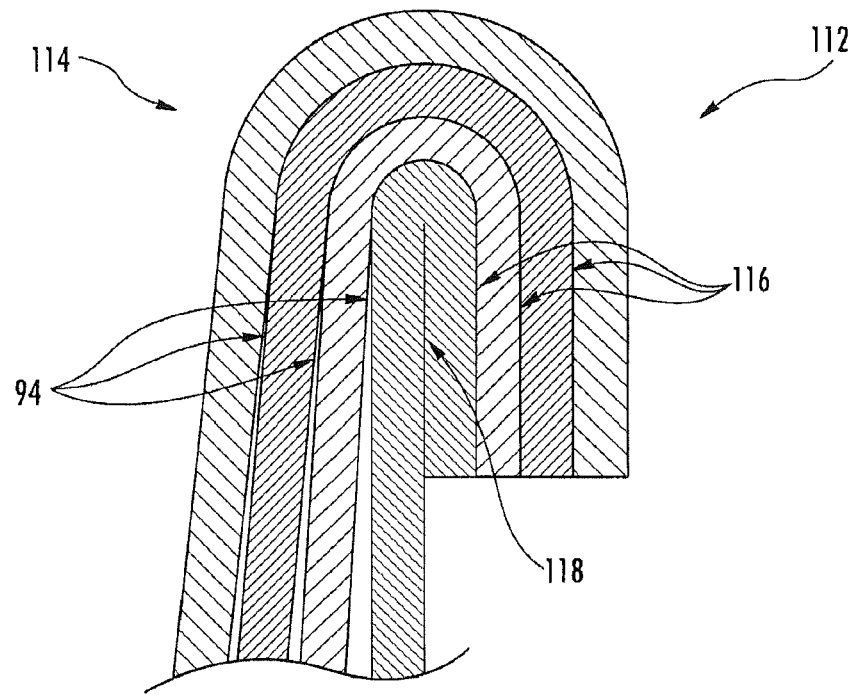
FIG. 18 is a schematic cross-sectional view of a top portion of the bag of FIG. 16, with the cross section taken along line 18-18 of FIG. 16, only the cross-section being shown, and the bag not being entirely flattened, so that a portion of the interior of the bag is shown.

In the following, initially the sealing system 20 is discussed primarily with reference to FIGS. 1-6, only with very general reference to a tube 22 (FIGS. 7-14) that is to have its upper end sealed closed by the sealing system 20 to form a bag 112 (FIGS. 16-18). Then, a method of the sealing system 20 processing the tube 22 is discussed very generally and briefly with reference to FIGS. 7-10. Then, the tube 22 with its ends unsealed is discussed in greater detail with reference to FIGS. 11-14. Then, material from which the tube may be constructed is discussed with reference to FIG. 15. Then, the bag 112 constructed from the tube 22 by the sealing system 20 is discussed with reference to FIGS. 16-18. Then, other embodiments and variations are discussed with reference to the remaining figures.

Figure 1:
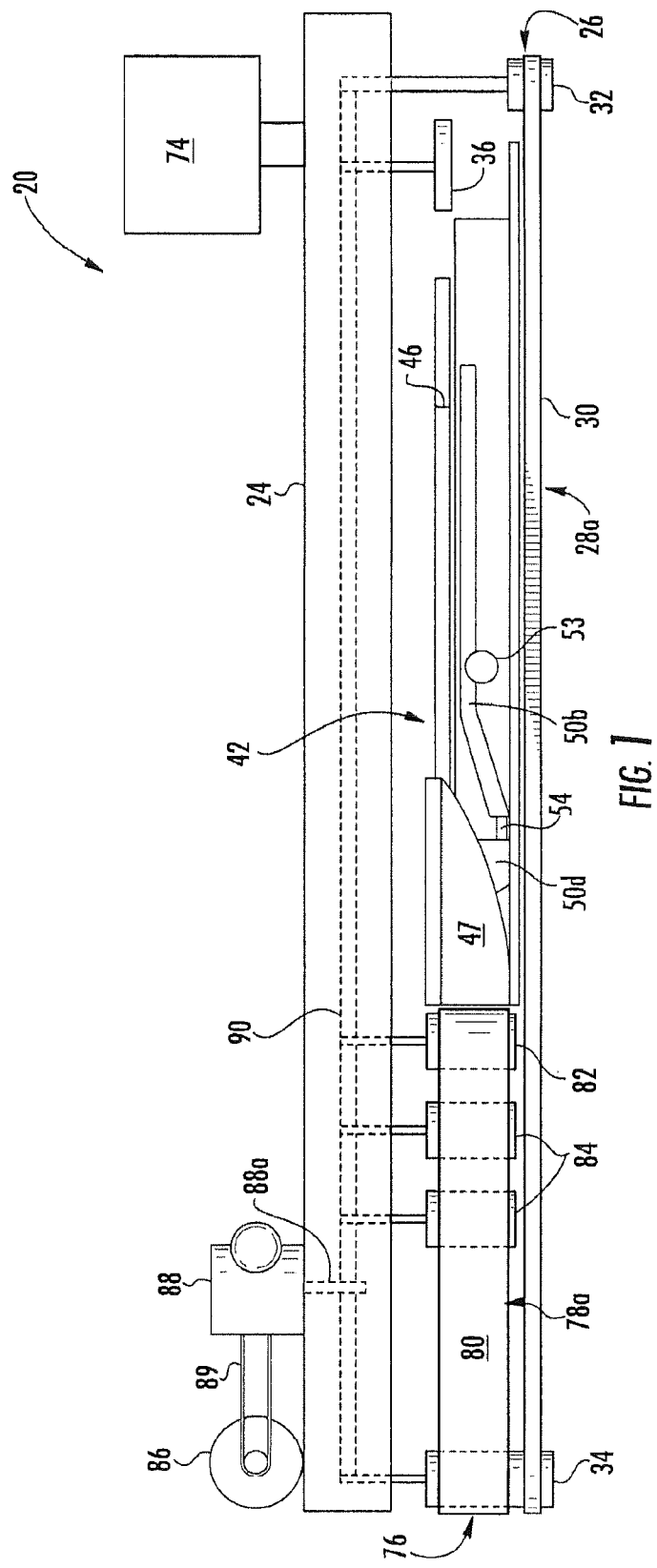
FIG. 1 is a schematic, front elevation view of a sealing system, in accordance with a first embodiment of this disclosure.

Referring to FIG. 1, the sealing system 20 includes a conventional frame. The frame has upright supports (not shown) that support an upper subframe 24 at a position that is elevated above a floor (not shown) or other suitable surface. The frame includes other frame components that support a wide variety of mounting brackets and other components of the sealing system 20.

The tube 22 (FIGS. 7-14) that is to have its upper end sealed closed by the sealing system 20 is introduced into an upstream end of the sealing system (i.e., the right-hand end in FIG. 1). The resulting bag 112 (FIGS. 16-18) with a sealed closed upper end exits a downstream end of the sealing system 20 (i.e., the left-hand end in FIG. 1). That is, the tube 22/bag 112 travels along a path in a downstream direction through the sealing system 20, and the downstream direction extends along the length of the sealing system 20. Accordingly and to provide a frame of reference for ease of understanding, throughout this Detailed Description section of this disclosure, the directional references to "upstream" and "downstream" are defined by/relate to the direction in which the tube 22/bag 112 travels through/along the length of the sealing system 20.

Figure 2:
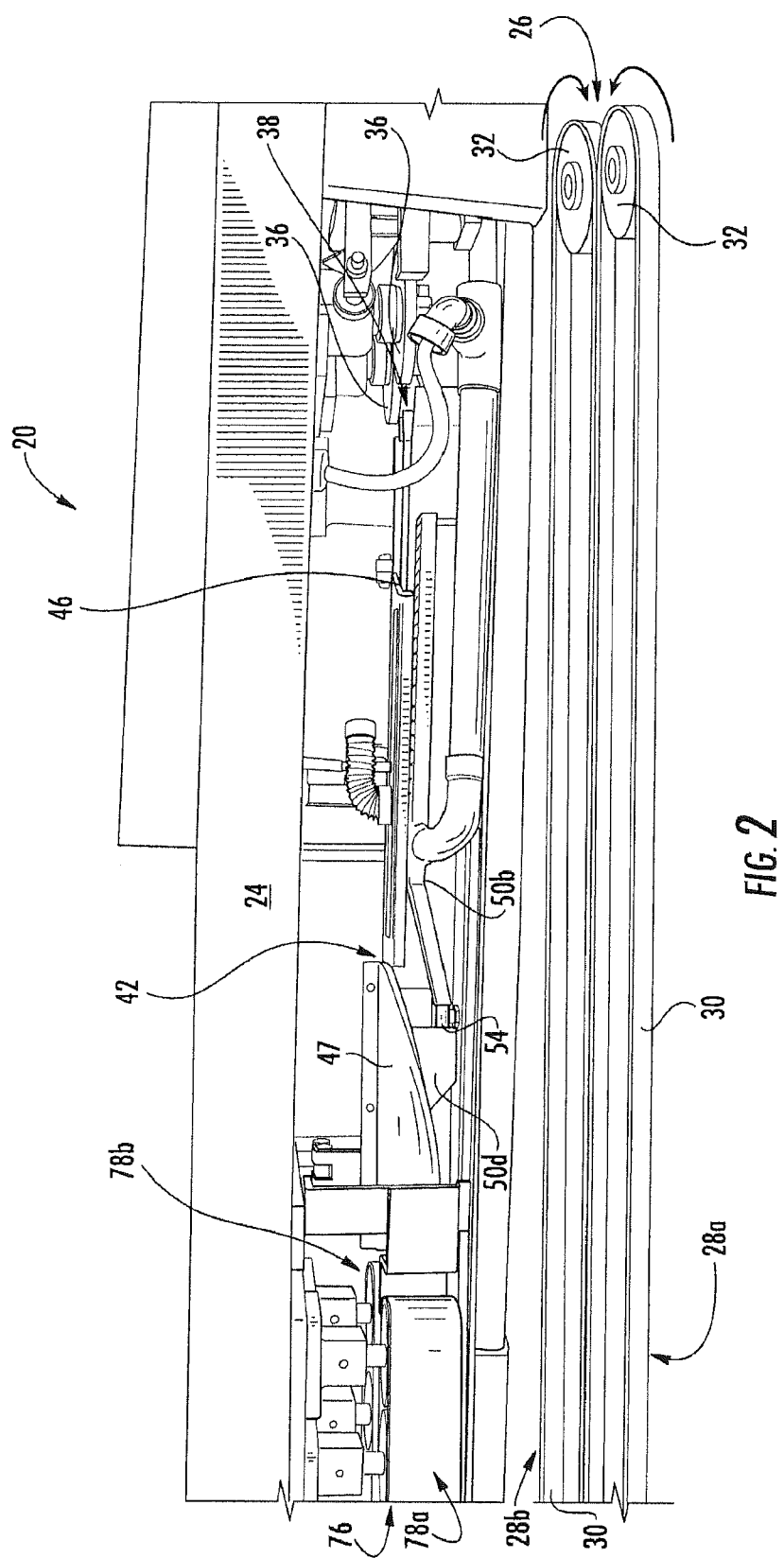
FIG. 2 is a schematic, front perspective view of a portion of the sealing system of FIG. 1.
Figure 3:
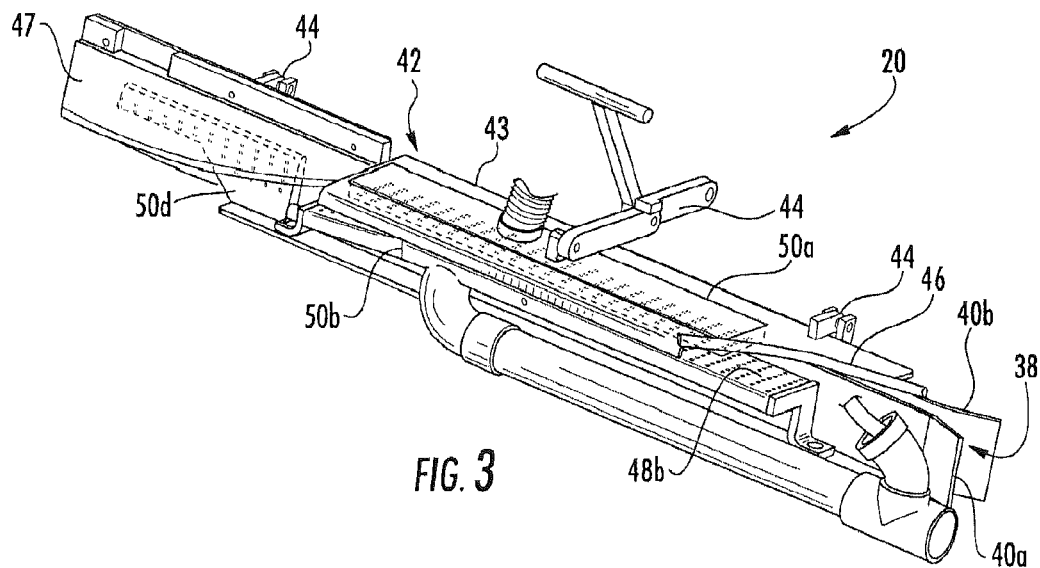
FIG. 3 is a schematic, front perspective view of a portion of the sealing system of FIG. 1, with a cover assembly of the sealing system in a closed configuration.

Referring to FIGS. 1 and 2, the sealing system 20 includes a transportation system comprising a conventional transport conveyor 26 that is not novel per se. The transport conveyor 26 extends between the upstream and downstream ends of the sealing system 20, although the transport conveyor may not extend for the entire length of the sealing system. The tube 22 is introduced to the transport conveyor 26 at the upstream end, and the transport conveyor carries the tube/bag through the sealing system 20, and discharges the bag from the downstream end of the sealing system.

As best understood with reference to FIG. 2, the transport conveyor 26 includes a rearward pulley system 28b that is positioned behind a forward pulley system 28a. Each of the transport conveyor's pulley systems 28a, 28b includes an endless belt 30 that extends around an upstream pulley 32 and a downstream pulley 34, and there may be intermediate pulleys (not shown) in the pulley system. The upstream and downstream pulleys 32, 34 are supported by shafts that hang down from the upper subframe 24.

The transport system may be configured differently. For example, the transport system may include multiple transport conveyors, or the like, arranged end to end. As a more specific example, the transport conveyor 26 may not extend all the way to the downstream end of the sealing system (e.g., the folded tube 22 (FIGS. 7-9) may be passed from a downstream end of a shorter transport conveyor to another conveyor (e.g., a nip conveyor/nipping apparatus 76) that may be characterized as being part of the transport system).

Referring to FIGS. 1 and 2, the sealing system 20 includes a conventional upstream guide that comprises a pair of adjacent guide rollers 36 and is not novel per se. The guide rollers 36 are supported by shafts hanging down from the upper subframe 24. The upstream guide/guide rollers 36 are for guiding an upper portion of the tube 22, which is being transported by the transport conveyor, into an upstream end of a guide channel 38 (FIGS. 3 and 4) defined between forward and rearward guide rails 40a, 40b. The guide rollers 36 may be driven, such that the guide rollers may be characterized as being part of the sealing system's transportation system (which also includes the transport conveyor 26).

The guide channel 38 is upwardly and downwardly open. Referring to FIGS. 1-4, the upper opening of the guide channel 38 may be covered and somewhat obstructed by a cover assembly 42 that is mounted to the frame of the sealing system 20. The cover assembly 42 may, optionally, be mounted by hinges 44 (FIG. 3), so that the cover assembly may be pivoted between a closed configuration (FIGS. 1-3) and an open configuration (e.g., see the partially open configuration shown in FIG. 4). More specifically, the closed cover assembly 42 covers (e.g., obstructs, typically without fully closing) the upper opening of the guide channel 38.

The cover assembly 42 comprises a substantially rigid cover plate 43 that is pivotably mounted by the hinge assemblies 44 and carries other components of the cover assembly 42. The cover assembly 42 includes a folding apparatus, which includes upstream and downstream diverters 46, 47, for folding the tube 22 into a folded-over configuration while the transport conveyor 26 transports the tube proximate (e.g., by, past, or the like) the folding apparatus. The lower surface of the cover plate 43 may optionally also be characterized as being part of the folding apparatus since it may play some role in the folding of the tube 22 (e.g., such as by not allowing the partially folded tube to unfold due to any resiliency of the tube).

More specifically, the cover assembly 42 includes a conventional, concavely curved upstream diverter 46 that is not novel per se. The upstream diverter 46 is mounted to and/or defined by the upstream end of the cover plate 43, for pivoting with the cover plate 43. The upstream diverter 46 is for initiating a folding over of the upper marginal portion of the tube 22. The upstream diverter 46 typically folds the upper marginal portion of the tube 22 downwardly about ninety degrees relative to the lower portion of the tube, so that the upper marginal portion of the tube extends approximately perpendicularly relative to the lower portion of the tube. For example, the upstream diverter 46 may be defined by a concavely cut upstream end of the cover plate 43, and/or the upstream diverter may include any suitable structure or material that is mounted to the upstream end of the cover plate 43 for aiding in the folding of the upper marginal portion of the tube.

It is conventional to include a folding apparatus downstream from the upstream diverter 46 for substantially completing the folding over of the upper portion of the tube 22. In this regard, a curved downstream diverter 47 is mounted to and/or defined by the downstream end of the cover plate 43, for pivoting with the cover plate 43. The downstream diverter 47 is shaped (e.g., contoured) for substantially completing the folding over of the upper portion of the tube 22, as will be discussed in greater detail below. More specifically, the downstream diverter 47 typically folds what was originally the upper marginal portion of the tube 22 about an additional ninety degrees downward relative to the lower portion of the tube.

The cover assembly 42 further includes an upper heat supplying apparatus (e.g., upper air outlet 48a (FIG. 4)) that may be any suitable apparatus (e.g., an infrared radiant heater) for causing heat transfer with at least one outer portion of the tube 22 while the transport conveyor 26 transports the tube proximate (e.g., by, past, or the like) the upper heat supplying apparatus. More specifically, the upper heat supplying apparatus is an upper air outlet 48a that is in the form of a plate that defines a wall of an upper plenum 50a (FIGS. 3 and 4) and has numerous holes (e.g., discharge ports) extending therethrough for discharging air from the upper plenum. The upper air outlet 48a extends along a portion of the length of the sealing system 20. The upper air outlet 48a may be a perforated plate, an air vent, louvers, an air distributor, or any other suitable structure for discharging a flow of air. Substantially all of the air outlet 48a is positioned downstream from the upstream diverter 46, although variations are within the scope of this disclosure.

The upper plenum 50a, which includes the upper air outlet 48a, may be mounted to and/or defined by the cover plate 43, such that the upper plenum 50a pivots with the cover plate 43. The upper plenum 50a is located at a position between the upstream and downstream ends of the cover plate 43. The upper plenum 50a is typically completely closed, except for including an inlet opening and the holes of the upper air outlet 48a. The holes of the upper air outlet 48a are located at a lower face of the upper plenum 50a/cover assembly 42.

The inlet opening to the upper plenum 50a may be located at the upper side or rear side of the upper plenum 50a/cover assembly 42. Since the cover assembly 42 is mounted for pivoting, provisions may be made so that the supply duct connected to the inlet opening of the upper plenum 50a accommodates for the pivoting. For example, the supply duct may be flexible, or it may comprise first and second ducts fit one inside the other and between which there can be relative rotation when the cover assembly is pivoted. Alternatively, the supply duct may be removably connected by a removable clamp to the inlet opening of the upper plenum 50a. Any suitable connection may be used. The upper plenum 50a is one of several plenums of the sealing system 20, and the supply of air to the several plenums is discussed below, after all of the plenums are introduced.

Figure 4:
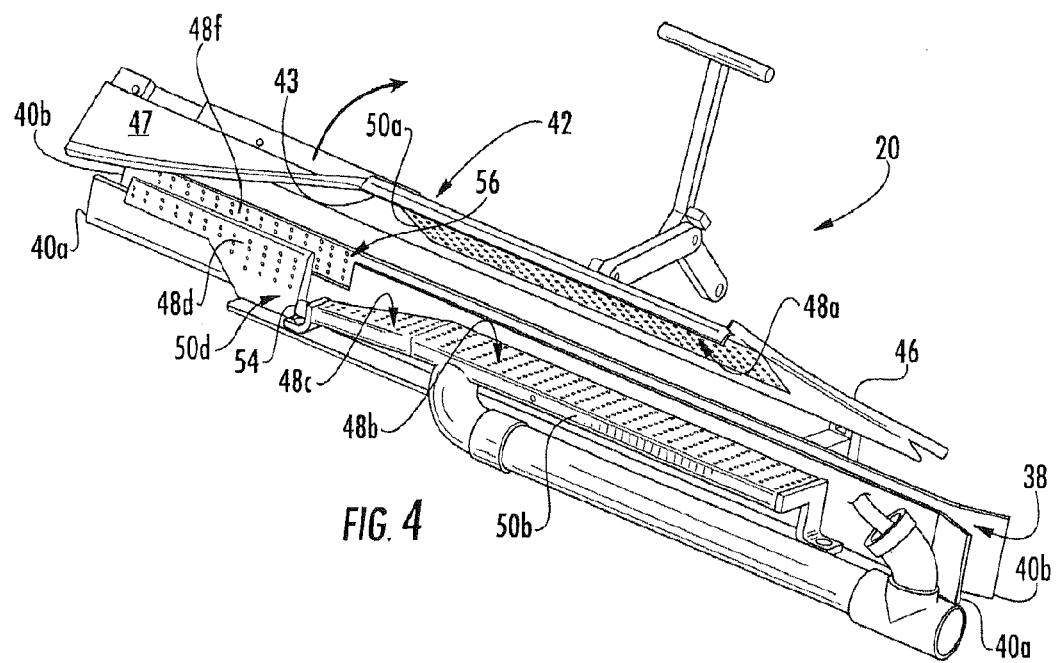
FIG. 4 is a schematic, front perspective view of the portion of the sealing system shown in FIG. 3, with the cover assembly in an open configuration.

As best understood with reference to FIG. 4, a lower heat supplying apparatus (e.g., upstream lower air outlet 48b and/or downstream lower air outlet 48c) is beneath the upper plenum 50a/covered by the cover assembly 42 while the cover assembly is in its closed configuration. The lower heat supplying apparatus may be any suitable apparatus (e.g., an infrared radiant heater) for causing heat transfer with at least one outer portion of the tube 22 while the transport conveyor 26 transports the tube proximate (e.g., by, past, or the like) the lower heat supplying apparatus.

More specifically, the lower heat supplying apparatus comprises one or more of the lower air outlets 48b, 48c, each of which is a plate that defines a wall of a lower plenum 50b and has numerous holes (e.g., discharge ports) extending therethrough for discharging air from the lower plenum. The lower air outlets 48b, 48c each extend along a portion of the length of the sealing system 20. The lower air outlets 48b, 48c each may be a perforated plate, an air vent, louvers, an air distributor, or any other suitable structure for discharging a flow of air.

The lower plenum 50b is fixedly mounted to the frame of the sealing system 20, so that the lower plenum is beneath the upper plenum 50a and covered by the cover assembly 42 while the cover assembly 42 is in its closed configuration. The lower plenum 50b includes a conventional upper section that includes the lower air outlet 48b and is not novel per se. The lower air outlet 48b is an upper face of the upper section of the lower plenum 50b, and the lower air outlet 48b extends parallel to, and is in opposing face-to-face relation with (e.g., is opposite), the lower face (i.e., the upper air outlet 48a) of the upper plenum 50a.

The lower plenum 50b includes a lower section that includes the lower air outlet 48c. The lower air outlet 48c extends obliquely, downwardly from the upper section of the lower plenum 50b. The lower plenum 50b is typically completely closed, except for including an inlet opening 53 (FIG. 1), the holes in the air outlets 48b, 48c, and an outlet opening in communication with a passageway 54 (e.g., tube) for supplying air to an inlet opening of a downstream plenum 50d.

Downstream heat supplying apparatuses (e.g., downstream air outlets 48d, 48e (FIG. 5)) are covered by the cover assembly 42 while the cover assembly is in its closed configuration. The downstream heat supplying apparatuses may be any suitable apparatuses (e.g., infrared radiant heaters) for causing heat transfer with at least one outer portion of the tube 22 while the transport conveyor 26 transports the tube proximate (e.g., by, past, or the like) the downstream heat supplying apparatuses.

More specifically, the downstream heat supplying apparatuses are the downstream air outlets 48d, 48e, each of which is a plate that defines a wall of a downstream plenum 50d and has numerous holes (e.g., discharge ports) extending therethrough for discharging air from the downstream plenum. The downstream air outlets 48d, 48e each may be a perforated plate, an air vent, louvers, an air distributor, or any other suitable structure for discharging a flow of air.

The downstream plenum 50d is fixedly mounted to the frame of the sealing system 20, so that the downstream plenum is downstream from the upper and lower plenums 50a, 50b. As schematically shown by dashed lines in FIG. 3, the downstream plenum 50d is covered by the downstream diverter 47 while the cover assembly 42 is in its closed configuration. The downstream diverter 47 and/or downstream plenum 50d are adapted (e.g., sized and arranged) so that the downstream diverter 47 fits over the downstream plenum 50d with clearance for allowing the folded tube 22 to pass between the downstream diverter and the downstream plenum, as will be discussed in greater detail below with reference to FIG. 9.

Figure 5:
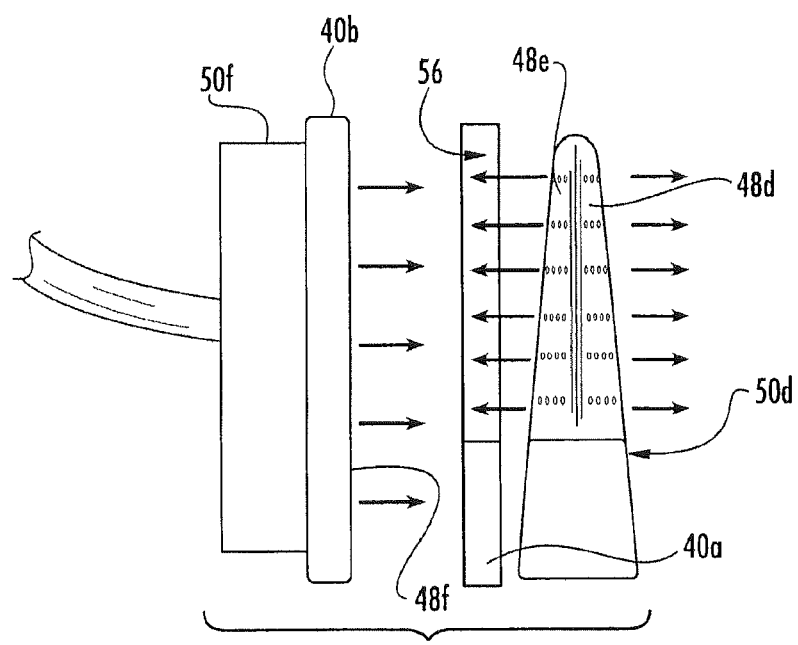
FIG. 5 is a schematic, left elevation, isolated view primarily of guide rails and downstream and rearward plenums of the sealing system of FIG. 1.

Referring to FIGS. 4 and 5, the downstream plenum 50d is generally (e.g., substantially) triangular shaped in that its opposite upright faces/downstream air outlets 48d, 48e extend obliquely and divergently with respect to one another and downwardly from an convexly curved upper surface of the downstream plenum. Each of the opposite upright faces/downstream air outlets 48d, 48e extends along a portion of the length of the sealing system 20. In addition and as best understood with reference to FIG. 5, each of the opposite upright faces/downstream air outlets 48d, 48e extend obliquely and convergently with respect to one another in the downstream direction. As a result, the upstream end of the downstream plenum 50d is wider than the downstream end of the downstream plenum. That is, the downstream plenum 50d becomes more narrow in the downstream direction.

The downstream plenum 50d is typically completely closed, except for including the holes in the downstream air outlets 48d, 48e and an inlet opening in communication with the passageway 54 (e.g., tube) for receiving a flow of air from the lower plenum 50b. The downstream plenum 50d may receive its flow of air from any other suitable source.

The downstream plenum 50d, and more particularly the downstream air outlet 48e, is proximate the downstream portion of the forward guide rail 40a. An opening 56 (FIGS. 4 and 5) is defined in and extends through the downstream portion of the forward guide rail 40a, so that the rearward face/air outlet 48e of the downstream plenum 50d is in opposing face-to-face relation with the opening 56. The downstream air outlet 48e is configured for discharging air through the opening 56, as will be discussed in greater detail below.

The opening 56 (FIGS. 4 and 5) that extends through the downstream portion of the forward guide rail 40a is arranged and sized so that the rearward face/air outlet 48e of the downstream plenum 50d is in opposing face-to-face relation with a rearward supplying apparatus (e.g., rearward air outlet 48f). The rearward supplying apparatus may be any suitable apparatus (e.g., an infrared radiant heater, or simply a fan or another type of conventional air mover) for causing heat transfer with at least one outer portion of the tube 22 while the transport conveyor 26 transports the tube proximate (e.g., by, past, or the like) the rearward supplying apparatus. More specifically, the rearward supplying apparatus is for providing a forced flow of cool air and/or air at substantially the same temperature as ambient air, for cooling a portion of the tube 22, as will be discussed in greater detail below.

More specifically, the rearward supplying apparatus is the rearward air outlet 48f, which is a plate (e.g., a portion of the rearward guide rail 40b) that defines a wall of a rearward plenum 50f and has numerous holes (e.g., discharge ports) extending therethrough for discharging air from the rearward plenum. The rearward air outlet 48f extends along a portion of the length of the sealing system 20. The rearward air outlet 48f may be a perforated plate, an air vent, louvers, an air distributor, or any other suitable structure for discharging a flow of air. The opening 56 in the forward guide rail 40a is substantially rectangular and substantially corresponds to the substantially rectangular shape of (e.g., the pattern of discharge ports in) the air outlet 48, although different shapes and arrangements are within the scope of this disclosure.

The rearward plenum 50ƒ is fixedly mounted to the frame or another component of the sealing system 20. For example, the rearward plenum 50ƒ may be mounted to a portion of the rearward guide rail 40b as shown in FIG. 5, so that the rearward plenum is downstream from the upper and lower plenums 50a, 50b. As best understood by contrasting FIGS. 3 and 4, the rearward plenum 50ƒ is covered by the downstream diverter 47 while the cover assembly 42 is in its closed configuration. The rearward plenum 50ƒ is typically completely closed, except for including the holes in the rearward air outlet 48ƒ and an inlet opening for receiving a flow of air. The rearward plenum's inlet opening may be located at the rear side of the rearward plenum 50ƒ.

Air may be supplied to the plenums 50a, 50b, 50d, 50ƒ in any suitable manner for helping to facilitate the desired sealing of the tube 22 to form (or close) a bag 112 (FIGS. 16-18). Each of the plenums 50a, 50b, 50d, 50ƒ may be part of a forced air system that is for providing a forced flow of air that may be heated or cooled. Each of the forced air supply systems may be at least generally conventional in nature. For example and in accordance with the first embodiment, a first forced air system includes the upper plenum 50a; a second forced air system includes the plenums 50b, 50d; and a third forced air system includes the rearward plenum 50ƒ. Alternatively, the plenums 50b, 50d may respectively be part of separate forced air systems, and/or other arrangements of plenums/forced air systems are within the scope of this disclosure. For example, the forced air system comprising the rearward air outlet 48ƒ may alternatively simply be in the form of a fan or another type of conventional air mover that is for supplying a flow of otherwise ambient air (e.g., relatively cool ambient air) for causing cooling heat transfer with the respective outer portion of the tube 22 while the transport conveyor 26 transports the tube proximate (e.g., by, past, or the like) the fan or the like.

Figure 6:
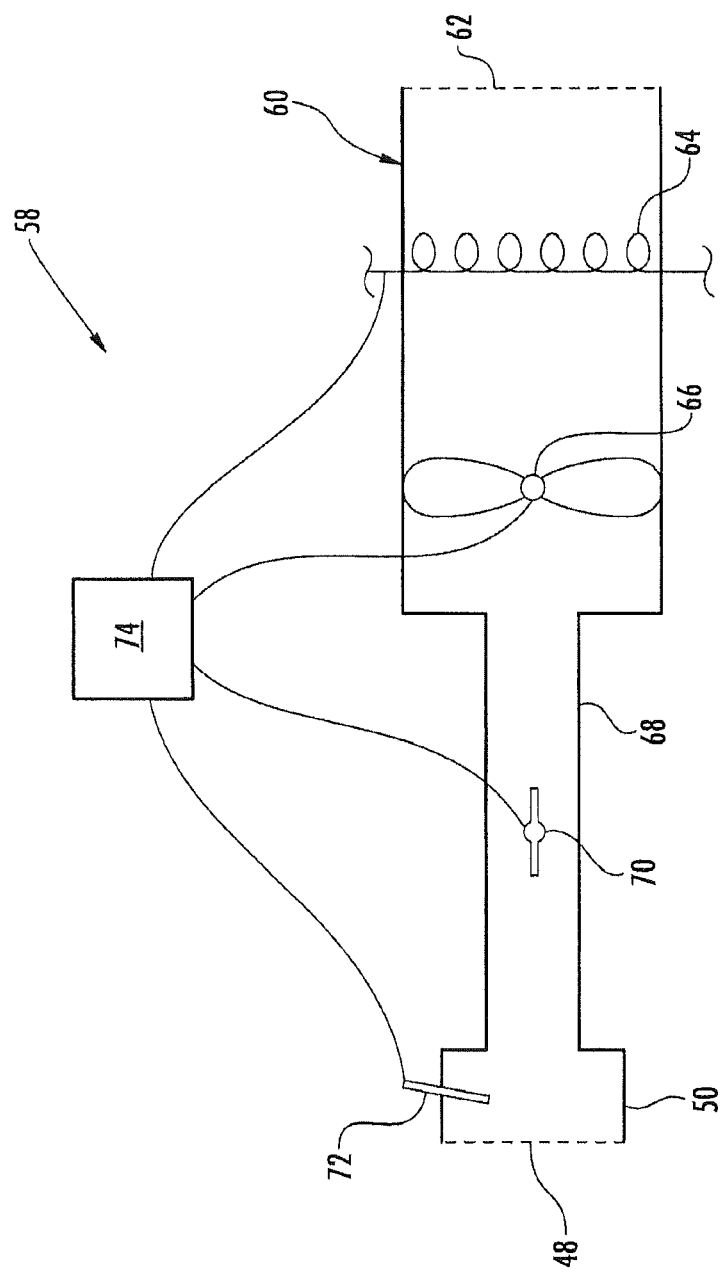
FIG. 6 is a schematic illustration of a representative forced air system of the sealing system, in accordance with the first embodiment.

FIG. 6 schematically illustrates a forced air system 58 that may be representative of each of the forced air systems (which respectively include the plenums 50a, 50b, 50d, 50ƒ) of the sealing system 20. The forced air system 58 may include a conventional air handler 60 having an air inlet 62, a heating and/or coiling coil 64 (e.g., any suitable device for changing the temperature of the flow of air, by adding and/or removing heat (e.g., a refrigeration system and/or heating element(s))), and a motor-operate air mover 66 (e.g., a motor-driven fan or any other suitable device for moving air).

The air supplied from the air handler 60 may flow in conventional duct(s) 68 or any other suitable structure that is optionally equipped with a conventional motor-operated, flow-control damper 70 or another suitable device. The duct(s) 68 discharge into one or more plenums 50 (e.g., the respective one or more of the plenums 50a, 50b, 50d, 50ƒ), and the flow of air is discharged from the plenum(s) 50 by way of one or more air outlets 48 (e.g., the respective one or more of the air outlets 48a-48ƒ). The air outlet 48 may include one or more holes or other openings for discharging a forced flow of air that is for providing forced convention. For example, the air outlet 48 may be a perforated plate, an air vent, louvers, an air distributor, or any other suitable structure for discharging a flow of air.

The plenum(s) 50 may be equipped with one or more temperature sensors 72 that may be connected to a controller 74. The controller 74 may also be connected to the coil 64, air mover 66 and damper 70 for purposes of control. The forced air system 58 may include any other suitable components such as, but not limited to, components for filtration. In addition and optionally, the forced air system including the plenum 50ƒ (FIG. 5) may omit the coil 64, and the coils 64 in the forced air systems including the plenums 50a, 50b, 50d may only be for adding heat. A variety of different forced air systems are within the scope of this disclosure (e.g., the types of or usage of the features of the forced air systems may vary, depending upon the types of materials, tubes 22 and bags being processed by the sealing system 20). Features of the controller 74 may be embodied in any suitable manner, such as in software, firmware and/or hardware modules, for providing control over operation of the sealing system 20/components of the sealing system/forced air systems/components of the forced air systems.

Figure 10:
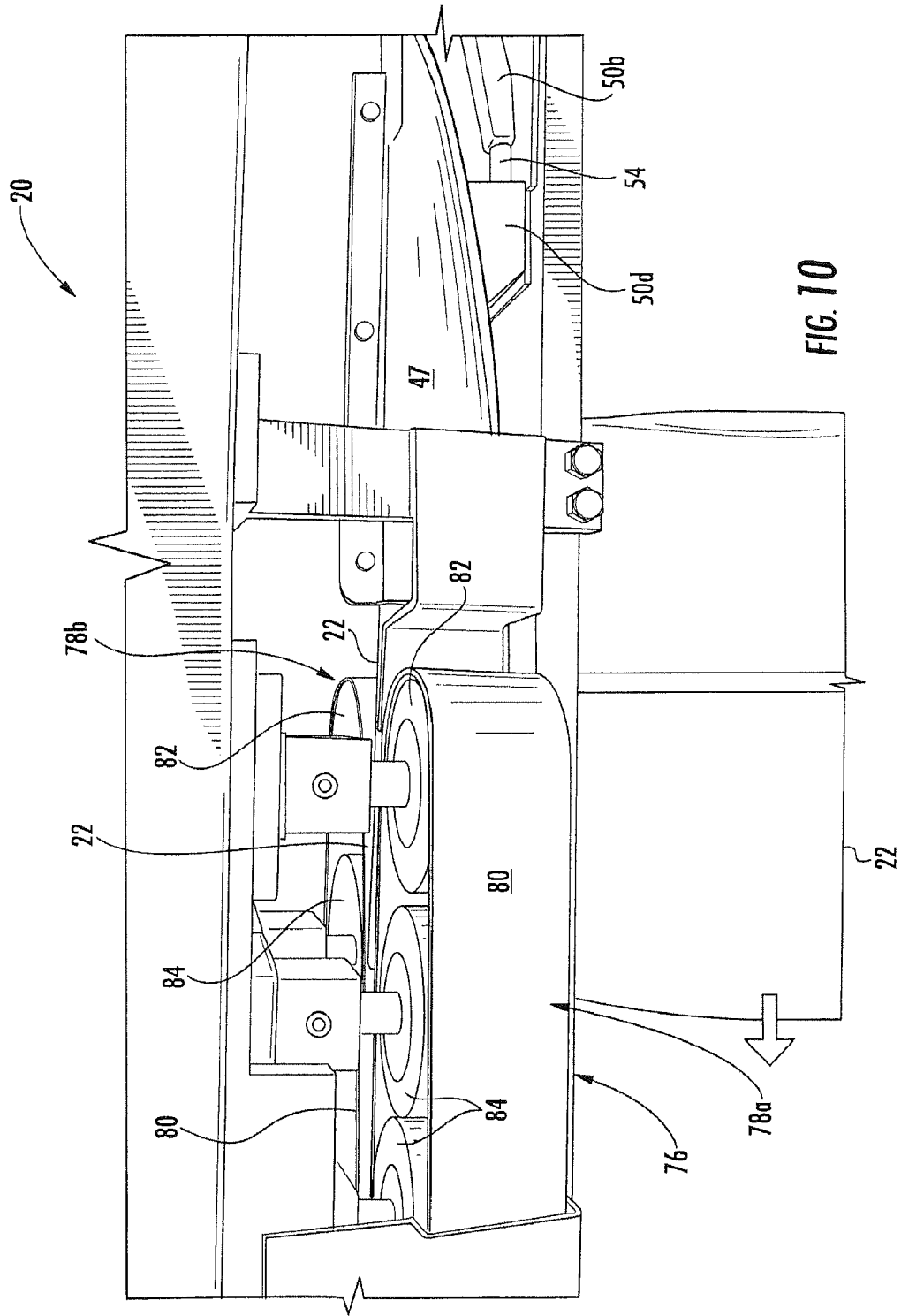
FIG. 10 is a schematic front elevation view of a portion of the sealing system of FIG. 1, showing the folded-over upper end of the tube being received by a nipping apparatus, in accordance with the first embodiment.

Referring primarily to FIGS. 1, 2 and 10, a conventional nipping apparatus 76, which is not novel per se, is positioned downstream from the folding apparatus (e.g., the upstream and downstream diverters 46, 47) and the supplying apparatuses (e.g., the air outlets 48a-48ƒ). The nipping apparatus 76 receives the tube 22 from the transport conveyor 26. Nonetheless, the transport conveyor 26 extends all the way to the downstream end of the sealing system 20, and the transport conveyor 26 at least partially carries the tube 22/bag all the way to the downstream end of the sealing system.

The nipping apparatus 76 performs a nipping function, but it may also be characterized as being part of the sealing system's transportation system (which also includes the transport conveyor 26), since the nipping apparatus may help in carrying the tube 22/bag to the downstream end of the sealing system 20. Also, and for example, the transport conveyor 26 may not extend all the way to the downstream end of the sealing system 20, such that the nipping apparatus 76, or another suitable device, completes the transporting of the tube 22 to the downstream end of the sealing system.

As best understood with reference to FIGS. 2 and 10, the nipping apparatus 76 includes a rearward pulley system 78b that is positioned behind a forward pulley system 78a.

Each of the nipping apparatus' pulley systems 78a, 78b includes an endless belt 80 that extends around an upstream pulley 82, intermediate pulleys 84, and a respective one of the downstream pulleys 34 (FIG. 1). The upstream and intermediate pulleys 82, 84 are supported by shafts that hang down from the upper subframe 24. The nipping apparatus 76 may be configured differently. For example, the nipping apparatus 76 may include multiple nipping conveyors, or the like, arranged end to end.

As best understood with reference to FIG. 1, the sealing system 20 includes a conventional drive system, which is not novel per se, for driving the respective pulleys of the transport conveyor 26 and the nipping apparatus 76, and the guide rollers 36. The drive system includes an electric motor 86 and a gear box 88. A drive chain or belt 89, or any other suitable device for transferring rotary power, connects the output shaft of the motor 86 to the input shaft of the gear box 88. The respective pulleys of the transport conveyor 26 and the nipping apparatus 76, and the guide rollers 36, are driven in a conventional manner by way of one or more chains or belts 90, or any other suitable devices for transferring rotary power. Some of the features of the drive system are hidden from view in FIG. 1 and, therefore, they are schematically illustrated by dashed lines. The one or more belts 90, or the like, connect the output shaft(s) 88a of the gear box 88 to the respective shafts that hang down from the upper subframe 24 and support the respective pulleys of the transport conveyor 26 and the nipping apparatus 76, and the guide rollers 36. One or more of the pulleys of the transport conveyor 26 and the nipping apparatus 76, and the guide rollers 36, may be idler pulleys or rollers that are not directly driven by the sealing system's drive system. Any suitable drive system(s) may be used in the sealing system 20.

The sealing system 20 may be constructed of any suitable materials. In addition, surfaces (e.g., metal surfaces) of the sealing system 20 that the tube 22 comes into sliding contact with (e.g., the folding apparatus) may be coated with Teflon brand coating or other suitable materials for reducing friction. The hot air supplied by the sealing system 20 may also help to reduce the friction associated with the tube 22 sliding relative to features of the sealing system.

Figure 7:
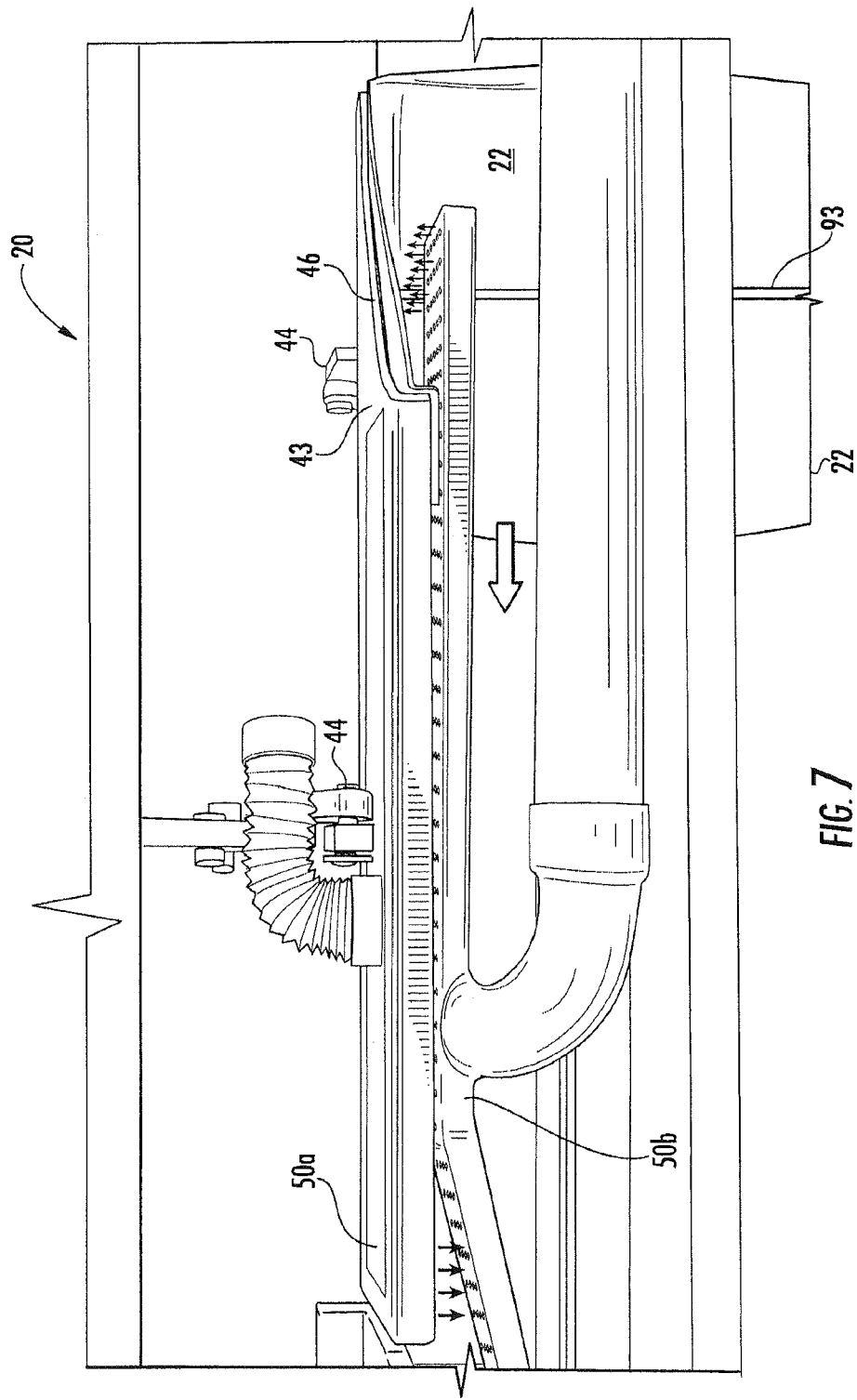
FIG. 7 is a schematic front elevation view of a flat tube being conveyed through a portion of the sealing system of FIG. 1, and it shows an upper end of the tube being bent over by an upstream diverter of the sealing system, in accordance with the first embodiment.
Figure 8:
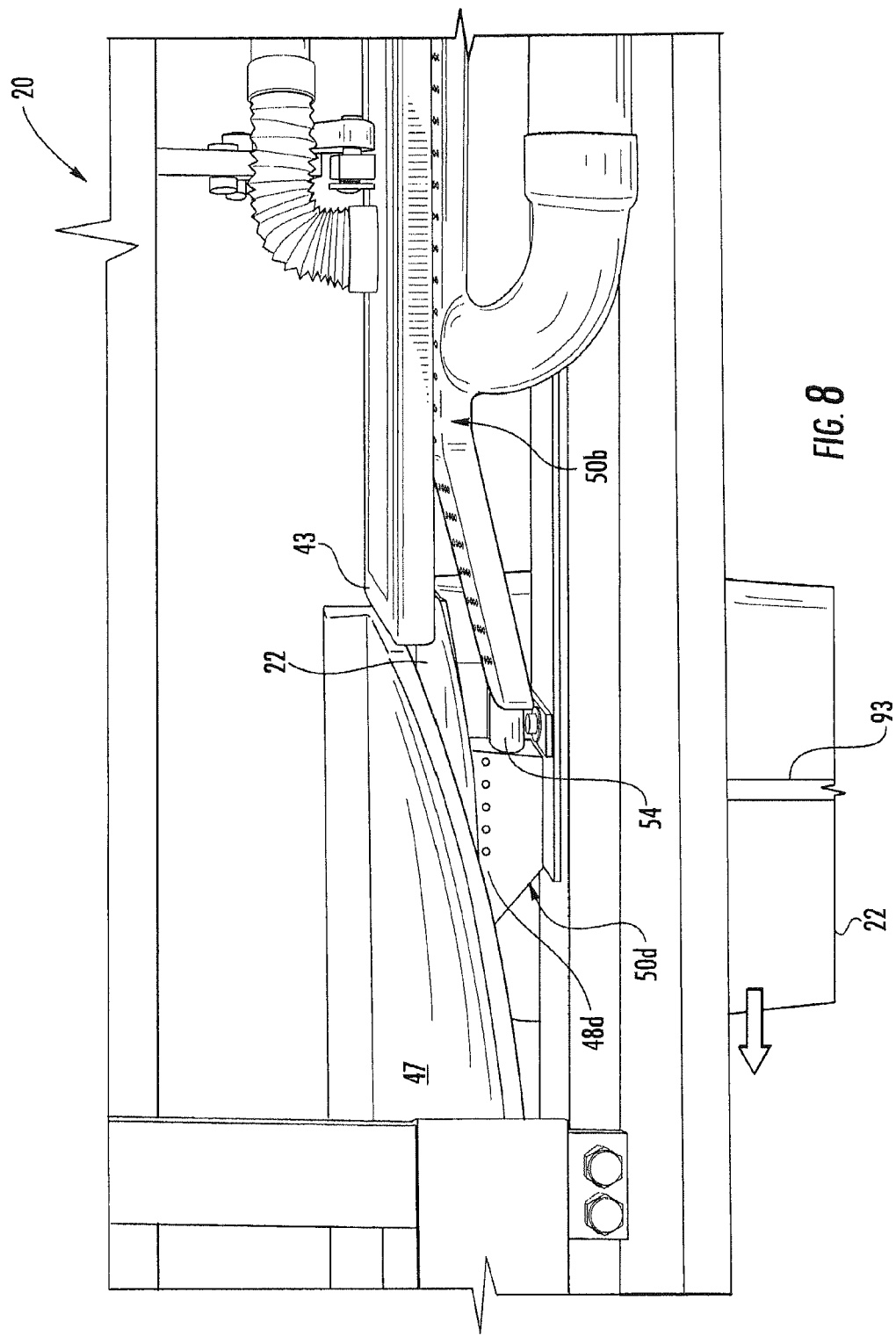
FIG. 8 is a schematic front elevation view of a portion of the sealing system of FIG. 1, and it shows an upper end of the tube being bent downwardly by a downstream diverter of the sealing system, which substantially completes the folding of the upper end of the tube, in accordance with the first embodiment.
Figure 9:
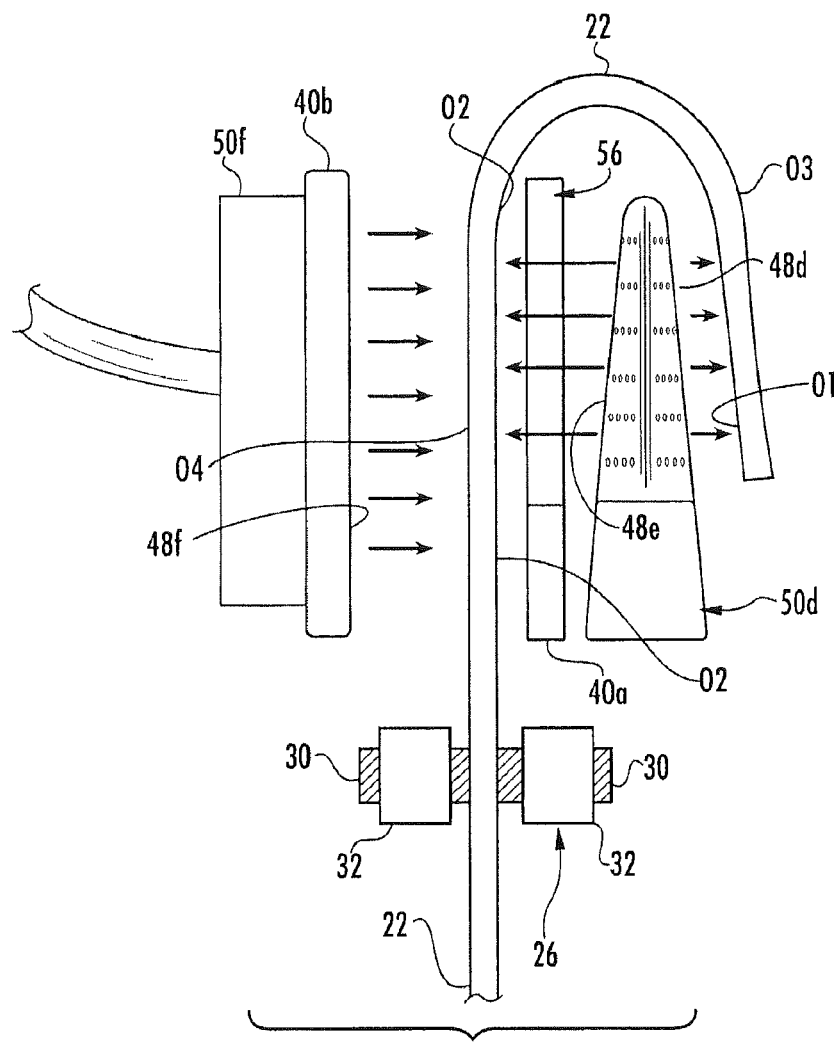
FIG. 9 is schematic and similar to FIG. 5, except for schematically illustrating the folded-over upper end of the tube, and showing a portion of the transport conveyor of the sealing system.

A method of the sealing system 20 processing the tube 22 is discussed very generally and briefly in the following with reference to FIGS. 7-10, in accordance with the first embodiment. FIGS. 7 and 8 schematically show the flat tube 22 being conveyed through and folded over by the folding apparatus (e.g., the upstream and downstream diverters 46, 47). FIG. 9 schematically shows the folded-over upper end of the tube 22 being conveyed between the downstream and rearward plenums 50d, 50f by the transport conveyor 26. FIG. 9 is schematic because, for example, some of the clearances shown are exaggerated. For example and in the context of the tube 22 passing between the downstream diverter 47 (FIGS. 1-4) and the downstream plenum 50d, typically just enough clearance will be provided for the tube to reasonably pass through without any unwanted effects. For example, while the cover assembly 42 is in its closed configuration, the outer surface of the downstream air outlet 48d and the inner surface of the downstream diverter 47 are in opposing face-to-face configuration with one another, and the clearance between the outer surface of the downstream air outlet 48d and the inner surface of the downstream diverter 47 is typically just large enough for the tube 22 to reasonably pass therethrough without any unwanted effects. As mentioned above, Teflon brand coatings, or other suitable materials for reducing friction, and the hot air supplied by the downstream plenum 50d may reduce friction and thereby aid the tube 22 in passing through the narrow clearance between the downstream diverter 47 (FIGS. 1-4) and the downstream plenum 50d. For example the upper rows of discharge ports in the downstream air outlets 48d, 48e may be no more than about one inch from the convexly curved top edge of the downstream plenum 50d, so that a sufficient amount of lubricating hot air reaches the outer surface of the convexly curved top edge of the downstream plenum. FIG. 10 schematically shows the folded-over upper end of the tube 22 being introduced into the nipping apparatus 76 for nipping.

Figure 13:
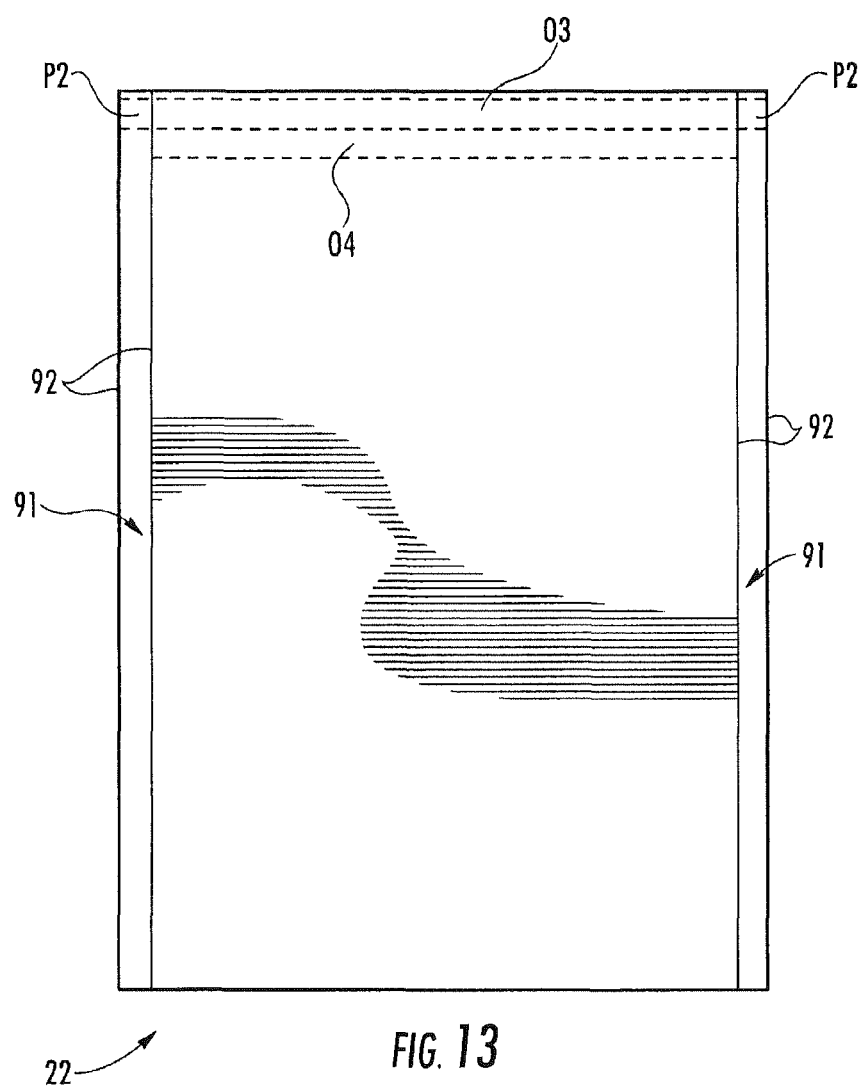
FIG. 13 is a schematic, rear elevation view of the tube of FIG. 11, with the side pleats folded outwardly and the tube in the flattened configuration.
Figure 14:
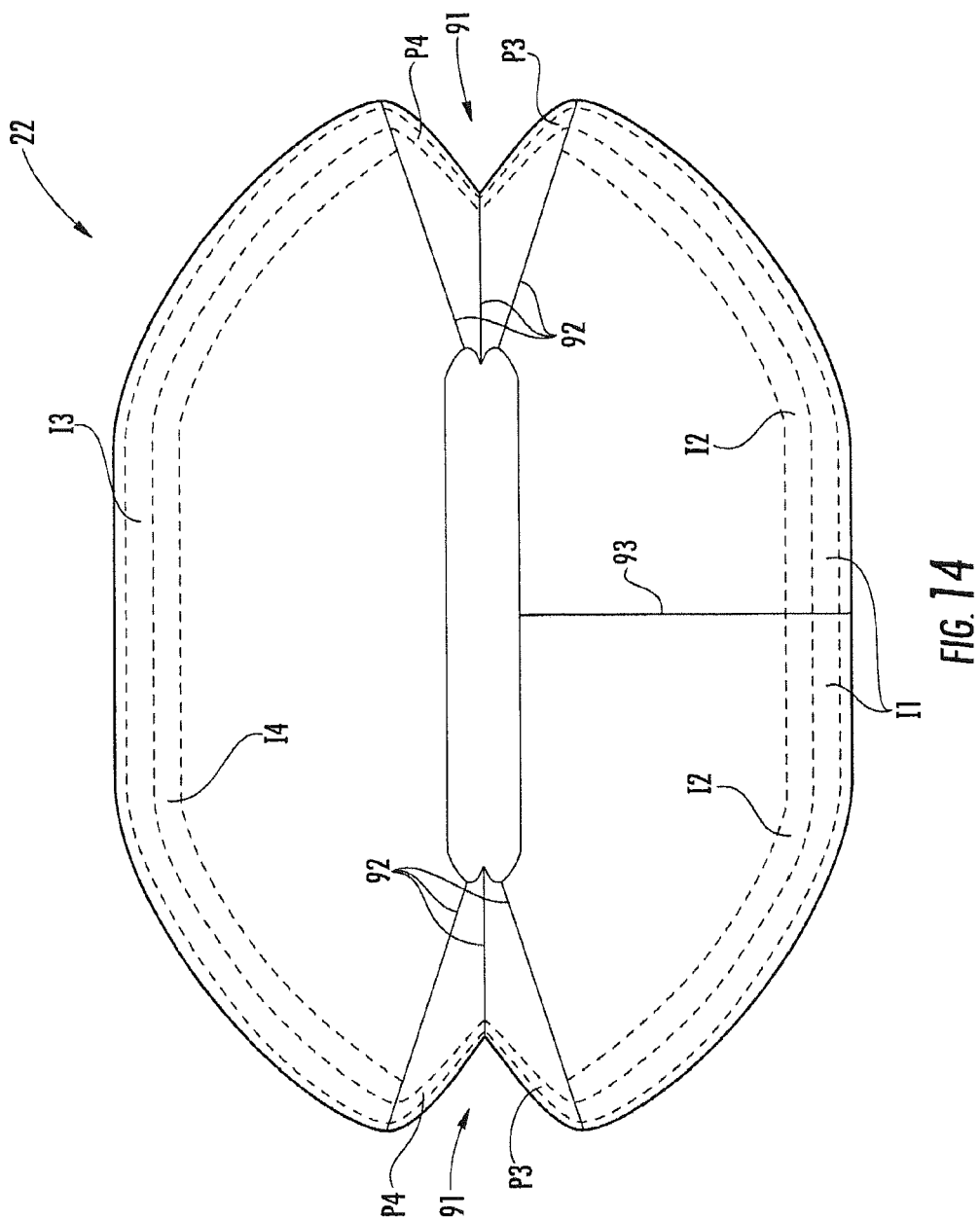
FIG. 14 is a schematic, top perspective view of the interior of the tube of FIG. 11 in an open configuration, with the pleats folded inwardly.

The tube 22 with its ends unsealed is discussed in greater detail in the following with reference to FIGS. 11-14, in accordance with the first embodiment. FIG. 11 shows the tube 22 with its optional side pleats 91 folded inwardly. In contrast, the front and rear views of FIGS. 12 and 13 show the pleats 91 folded outwardly, although the pleats typically remain folded inwardly at least until after the bag containing the pleats is filled. The pleats 91 are defined by lines of disruption 92 (e.g., fold lines). FIG. 14 is a top perspective view of the interior of the tube 22 in an open configuration, with the pleats 91 folded inwardly. FIGS. 12 and 13 are schematic because, for example, they include dashed lines for schematically identifying that the front side of the tube 22 includes a first outer (marginal) portion O1 of the tube and a second outer portion O2 of the tube, and the rear side of the tube includes a third outer (marginal) portion O3 of the tube and a fourth outer portion O4 of the tube. FIG. 14 is schematic because, for example, it includes dashed lines for schematically identifying that the interior surface of the front side of the tube 22 includes first and second inner portions I1, I2 that respectively correspond to the first and second outer potions O1, O2, and the interior surface of the rear side of the tube 22 includes third and fourth inner portions I3, I4 that respectively correspond to the third and fourth outer potions O3, O4. Similarly, each pleat 91 is schematically shown as including surface portions P1, P2, P3, P4. The pleats 91 may be omitted.

In accordance with the first embodiment, the tube 22 comprises a sheet of packaging material 100 (FIG. 15) with opposite edges that have been joined together at a longitudinal seal 93 (FIGS. 11, 12 and 14) that extends been the opposite ends of the tube and may be in the form of a foldover seal, fin seal, or any other suitable seal, or the like. In accordance with the first embodiment and as shown in the figures herewith, the edges at the opposite ends of the tube 22 are "straight cut" (e.g., at least substantially straight cut (i.e., not step cut)). Alternatively, the edges may not be required to be "straight cut."

The packaging material 100 from which the tube 22 may be constructed is described in the following with reference to FIG. 15, in accordance with the first embodiment. The packaging material 100 generally includes a substrate 102 (any suitable substrate (e.g., a high strength substrate) such as, but not limited to, paper, polymer film, or a woven polymer substrate) and a pair of facing systems 104, 106, each of which may include one or more layers that are coextruded and/or otherwise joined to one another. Such layers may include polymer films, polymer or polymeric coatings or layers, paper layers, other woven materials or nonwoven materials, or any other suitable material. In accordance with the first embodiment, the substrate 102 is a woven polymer substrate, although other substrates may be used. Each facing system 104, 106 of the packaging material 100 includes an outermost surface 108, 110 that respectively defines the inner (i.e., interior) and outer (i.e., exterior) sides or faces 108, 110 of the packaging material 100. Each side 108, 110 of the packaging material 100 includes (or is provided with) at least one area or zone (e.g., one or more of outer portions O1-O4 and inner portions I1-I4) that is capable of being joined to the respective surface of the packaging material 100 using a heat sealable material, adhesive, or otherwise. More specifically and in accordance with the first embodiment, the entirety of the interior and exterior surfaces of the tube 22 comprise (e.g., are constructed of or have had applied thereto) a heat sealable material.

A bag 112 (FIGS. 16-18) formed form the tube 22 by the sealing system 20, and an example of a suitable method for forming the bag, are discussed in the following, in accordance with the first embodiment. The side pleats 91 of the bag 112 typically remain folded inwardly until the bag is filled. The end of the bag 112 includes a shear seal closure 114 that includes both a pinch seal 116 and a foldover seal 118. Referring to FIGS. 12-14, 17 and 18, in the pinch seal 116:

all (e.g., substantially all) of the portions of the inner portions I1, I3 that are in opposing face-to-face relation with one another are in opposing face-to-face contact with one another and are sealed to one another;

at each pleat 91, all (e.g., substantially all) of the surface portions P1, P2 are in opposing face-to-face contact with one another and are sealed to one another;

at each pleat 91, all (e.g., substantially all) of the surface portion P3 and the inner portion I1 are in opposing face-to-face contact with one another and are sealed to one another; and at each pleat 91, all (e.g., substantially all) of the surface portion P4 and the inner portion I3 are in opposing face-to-face contact with one another and are sealed to one another.

In the foldover seal 118, all (e.g., substantially all) of the outer portions O1, O2 are in opposing face-to-face contact with one another and are sealed to one another. In accordance with the first embodiment, when the sealing system 20 is used to form the shear seal closure 114, the sealing system operates in a manner that seeks to avoid formation of any seals in addition to those discussed immediately above for the shear seal closure 114/pinch seal 116/foldover seal 118, in order to maximize the volume of the interior of the bag 112. For example, unsealed areas 94 are identified in FIGS. 17 and 18. Alternatively, additional seals or sealed areas may be included.

An example of a method of forming the shear seal closure 114 is described in the following, in accordance with the first embodiment. The flattened tube 22, with its pleats 91 folded inwardly, is introduced into the upstream end of the sealing system 20. The tube 22 is introduced so that the longitudinal seal 93 faces forwardly (as shown in FIGS. 7 and 8) and the imaginary demarcation (e.g., see the respective dashed line in FIG. 12) between the outer portions O1, O2 is at substantially the same elevation as the upstream diverter 46. Therefore, when the tube 22 engages the upstream diverter 46, the upstream diverter begins to form a fold/fold line in the tube at the imaginary demarcation between the outer portions O1, O2.

Then, as the partially folded tube 22 continues to be carried downstream by the transport conveyor 26, the air outlets 48*a*, 48*b*, 48*c* (FIG. 4) are respectively in opposing face-to-face relation with and discharge hot air against the outer portions O3, O1 so that the outer portions O3, O1 are heated by forced convention. The air outlets 48*a*, 48*b* are opposite from one another. Similarly, the air outlets 48*a*, 48*c* are opposite from one another. In addition, the outer portions O3, O1 are opposite from one another.

The surfaces that are sealed together as part of the pinch seal 116 (FIGS. 17 and 18) may comprise (or have applied to at least a portion thereof) a heat sealable and/or adhesive material, for example, a heat sealable polymer film, a heat sealable coating, a hot melt adhesive, or any other suitable material for forming the pinch seal 116, as needed to create the desired heat seal (e.g., to provide strength, protection from contamination or infestation by insects, and so on). When exposed to heat, the heat sealable and/or adhesive material is operative for joining the surfaces that are sealed together as part of the pinch seal 116. In accordance with the first embodiment, the pinch seal 116 extends all the way (substantially all the way) from one side of the bag 112 to the other side of the bag. However, it will be appreciated that the pinch seal 116 may be spaced from the opposite edges of the bag 112 and/or may have other transverse and/or longitudinal dimensions.

The pinch seal 116 may generally be formed at a temperature below the distortion or softening temperature of the woven polymer substrate 102 (FIG. 15) and/or any other components of the packaging material 100 that are not intended to be softened. For example, where the woven polymer substrate 102 comprises polypropylene, which typically softens at about 350° F., the heat seal temperature for forming the pinch seal 116 may generally be less than about 350° F., for example, from about 250° F. to about 300° F., or to about 325° F. Accordingly, the air outlets 48*a*, 48*b*, 48*c* that are respectively in opposing face-to-face relation with and discharge hot air against the outer portions O3, O1 provide the hot air at a temperature that is high enough to provide the heat seal temperature for forming the pinch seal 116, yet not so high so as to cause the woven polymer substrate 102 to reach its softening temperature. The desired or required temperature of the hot air discharged by the air outlets 48*a*, 48*b*, 48*c* may depend upon various factors such as, but not limited to, the dwell time (e.g., how quickly the tube 22 is transported through the sealing system 20).

As the partially folded, heated tube 22 continues to be carried downstream by the transport conveyor 26, the tube 22 engages the downstream diverter 47 which completes (e.g., substantially completes) folding the tube so that the tube is in the folded-over configuration that is schematically shown in FIG. 9 (e.g., the substantially one hundred eight degree folded-over configuration). As best understood with reference to FIG. 9 and for example, while the tube 22 is in the folded-over configuration: the first and second outer portions O1, O2 of the tube 22 are facing substantially toward one another, and the third and fourth outer portions O3, O4 of the tube are facing substantially away from one another.

At about the same time that the downstream diverter 47 substantially provides the folded-over configuration of the tube 22, the air outlets 48*d*, 48*e*, 48*f* (FIG. 9) are respectively in opposing face-to-face relation with and discharge air against the outer portions O1, O2, O4 so that heat is transferred with respect to the outer portions O1, O2, O4 by way of forced convention. The air outlets 48*d*, 48*e* are opposite from one another. Similarly, the air outlets 48*e*, 48*f* are opposite from one another. The air outlets 48*d*, 48*f* may also be characterized as being opposite from one another. In addition, the outer portions O3, O1 are opposite from one another. While the tube 22 is in the folded-over configuration, outer portions O1, O2 are opposite from one another. The outer portions O1, O4 may also be characterized as being opposite from one another, and the outer portions O3, O2 may also be characterized as being opposite from one another.

More specifically, the air outlets 48*d*, 48*e* discharge hot air against the outer portions O1, O2 so that the outer portions O1, O2 are heated by forced convention; and the air outlet 48*f* discharges cool air or air at ambient temperature (e.g., relatively cool air) against the outer portion O4 so that the outer portion O4 is cooled by forced convention. The above-discussed heating by forced convection is for helping to facilitate forming of the above-discussed seals of the shear seal closure, and the above-discussed cooling by forced convection is for helping to avoid forming any more than the seal between the outer portions O1, O2 when the foldover seal 118 is formed.

The surfaces that are sealed together as part of the foldover seal 118 may comprise (or have applied to at least a portion thereof) a heat sealable and/or adhesive material, for example, a heat sealable polymer film, a heat sealable coating, a hot melt adhesive, or any other suitable material for forming the foldover seal 118, as needed to create the desired heat seal (e.g., to provide strength, protection from contamination or infestation by insects, and so on). When exposed to heat, the heat sealable and/or adhesive material is operative for joining the surfaces that are sealed together as part of the foldover seal 118. In accordance with the first embodiment, the foldover seal 118 extends all the way (substantially all the way) from one side of the bag 112 to the other side of the bag. However, it will be appreciated that the foldover seal 118 may be spaced from the opposite edges of the bag 112 and/or may have other transverse and/or longitudinal dimensions.

The foldover seal 118 may generally be formed at a temperature below the distortion or softening temperature of the woven polymer substrate 102 (FIG. 15) and/or any other components of the packaging material 100 that are not intended to be heat sealed. For example, where the woven polymer substrate 102 comprises polypropylene, which typically softens at about 350° F., the heat seal temperature for forming the foldover seal 118 may generally be less than about 350° F., for example, from about 250° F. to about 300° F., or to about 325° F. Accordingly, the air outlets 48b, 48c, 48d, 48e, that are respectively in opposing face-to-face relation with and discharge hot air against the outer portions O2, O1 provide the hot air at a temperature that is high enough to provide the heat seal temperature for forming the foldover seal 118, yet not so high so as to cause the woven polymer substrate 102 to reach its softening temperature.

Reiterating from above, if needed, air substantially at ambient temperature or cooled air may be directed by the air outlet 48f against the outer portion O4 in a manner that seeks to prevent the interior surfaces 108 of the tube 22 from being joined to one another behind the foldover seal 118 (which would reduce the volume of the interior space of the bag 112). However, other possibilities are contemplated. The desired or required temperature of the air discharged by the air outlets 48d, 48e, 48f may depend upon various factors such as, but not limited to, the dwell time (e.g., how quickly the tube 22 is transported through the sealing system 20).

The heat sealable and/or adhesive material may lie outside of the area in which the foldover seal 118 and the pinch seal 116 are to be formed. For example, all or a portion of the interior or exterior surfaces 108, 110 of the tube 22 may comprise a heat sealable polymer film or polymeric material.

The nipping apparatus 76 nips the upper portion of the tube 22 in the folded-over configuration to simultaneously (e.g., substantially simultaneously) complete the formation of the pinch seal 116 and the foldover seal 118. Then, the resulting bag 112 is discharged from the downstream end of the sealing system 20/conveyor assembly 42/nipping apparatus 76.

Figure 19:
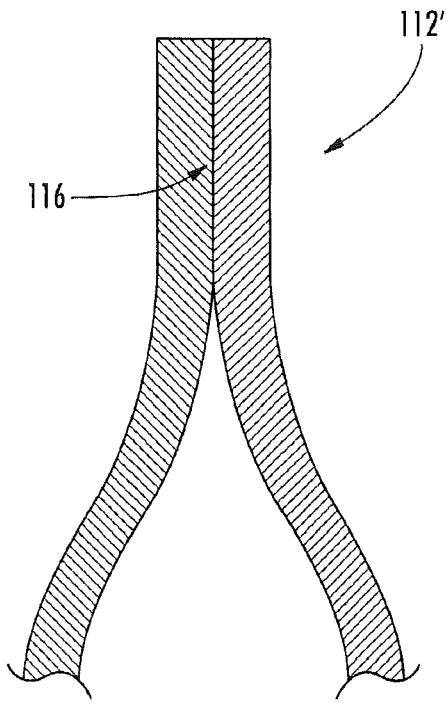
FIG. 19 is a schematic cross-sectional view of a portion of a bag of a second embodiment of this disclosure, with the cross section taken similarly to that for FIG. 17.
Figure 20:
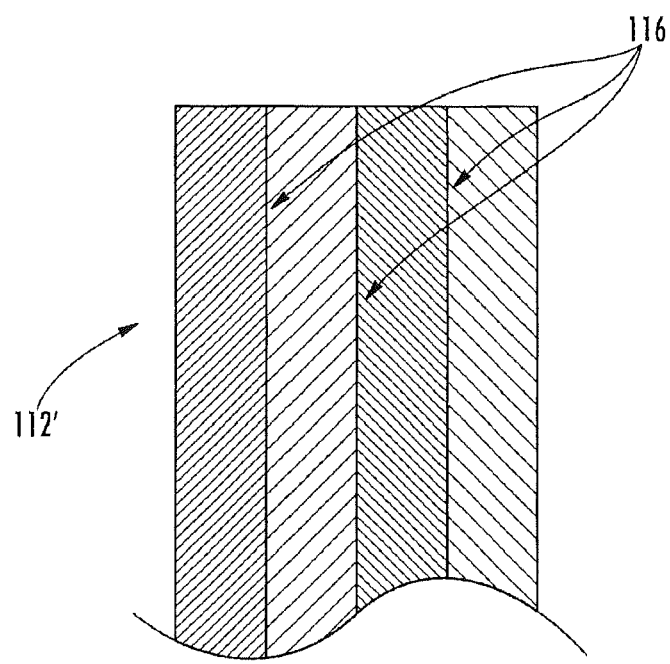
FIG. 20 is a schematic cross-sectional view of a portion of the bag of the second embodiment, with the cross section taken similarly to that for FIG. 18.

A second embodiment of this disclosure is like the first embodiment, except for variations noted in this disclosure and variations that will be apparent to one of ordinary skill in the art. FIG. 19 is a schematic cross-sectional view of a portion of a bag of the bag 112' second embodiment, with the cross section taken similarly to that of FIG. 17; and FIG. 20 is a schematic cross-sectional view of a portion of the bag 112' of the second embodiment, with the cross section taken similarly to that of FIG. 18. The sealed closure of the bag 112' of the second embodiment is not folded over, and it only includes the pinch seal 116 (i.e., the foldover seal 118 (FIGS. 17 and 18) is omitted). In accordance with one acceptable example, the closure of the bag 112' of the second embodiment may be formed in the sealing system by 20 by introducing the tube 22 so that the top edge of the tube is slightly below the elevation as the upstream diverter 46 (i.e., the tube is not folded) and hot air is discharged by both of the air outlets 48e, 48f (FIG. 5). The other air outlets 48a, 48b, 48c, 48d may be disabled or otherwise not used, or the like. That is, it is within the scope of this disclosure for a user of the sealing system 20 to select the air outlets to be used/not to be used, depending upon the circumstances. For example, dampers 70 (FIG. 6) and/or other types of valves and/or any other suitable controlling devices may be included in the sealing system 20, or more specifically in the forced air systems 58 (FIG. 6), for selectively controlling (e.g., disabling or enabling) flow to one or more of the above-discussed plenums and/or air outlets.

Figure 21:
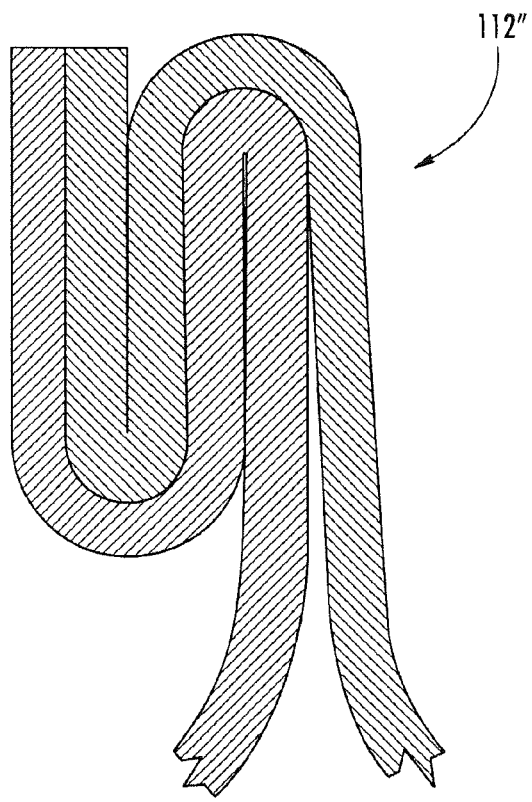
FIG. 21 is a schematic cross-sectional view of a portion of a bag of a third embodiment of this disclosure, with the cross section taken similarly to that for FIG. 17.
Figure 22:
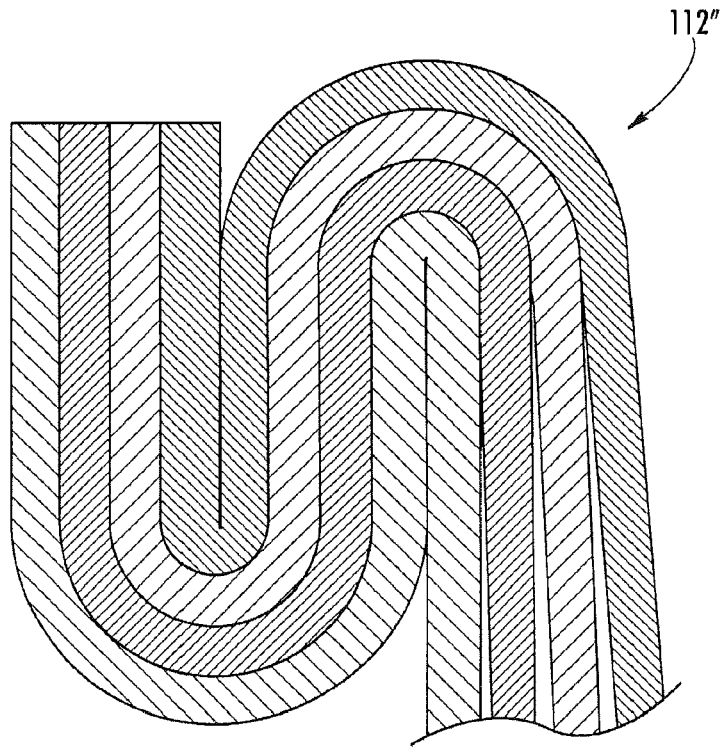
FIG. 22 is a schematic cross-sectional view of a portion of the bag of the third embodiment, with the cross section taken similarly to that for FIG. 18.

A third embodiment of this disclosure is like the first embodiment, except for variations noted in this disclosure and variations that will be apparent to one of ordinary skill in the art. FIG. 21 is a schematic cross-sectional view of a portion of a bag 112" of the third embodiment, with the cross section taken similarly to that of FIG. 17; and FIG. 22 is a schematic cross-sectional view of a portion of the bag 112" of the third embodiment, with the cross section taken similarly to that of FIG. 18. In accordance with one acceptable example, the closure of the bag 112" of the third embodiment may be formed in the sealing system by 20 by passing the upper end of the bag 112 of FIG. 16 through the sealing system a second time, to substantially repeat the method of the first embodiment, and therefore form a double shear seal closure.

Figure 23:
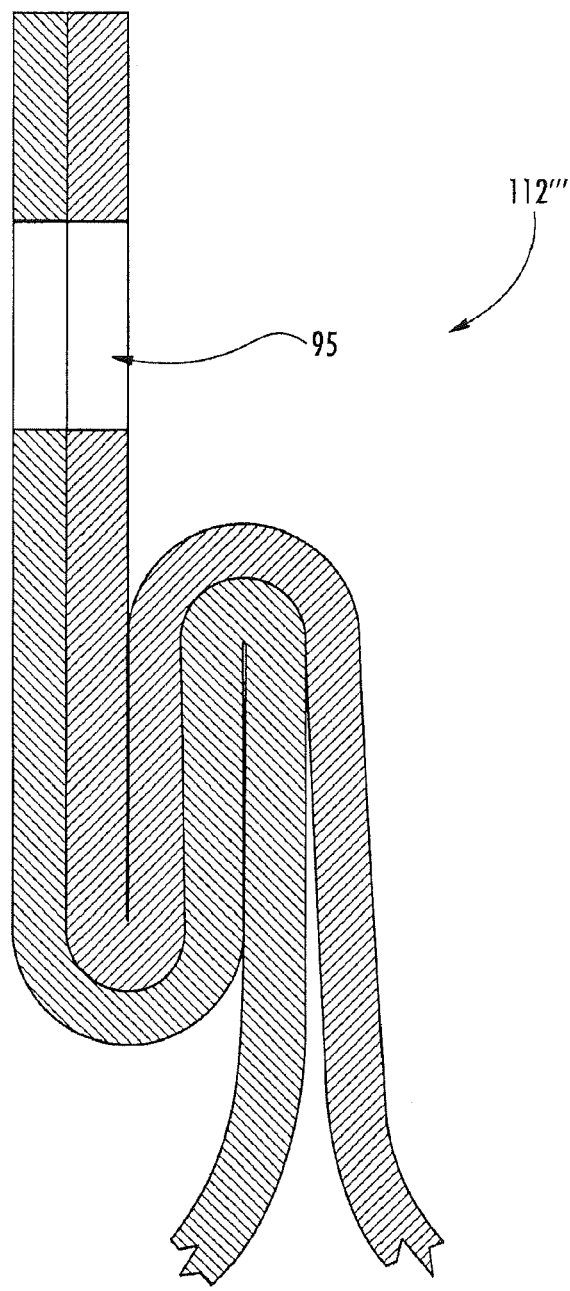
FIG. 23 is a schematic cross-sectional view of a portion of a bag of a fourth embodiment of this disclosure, with the cross section taken similarly to that for FIG. 17.

A fourth embodiment of this disclosure is like the third embodiment, except for variations noted in this disclosure and variations that will be apparent to one of ordinary skill in the art. FIG. 23 is a schematic cross-sectional view of a portion of a bag 112''' of the fourth embodiment, with the cross section taken similarly to that of FIG. 17. In the double shear seal closure of the bag 112' of the fourth embodiment, the end/pinch seal farthest from the interior of the bag is extended, and an integral grasping feature or handle generally comprising an aperture 95 or cutout extends through the pinch seal farthest from the interior of the bag. A flap may be retained in the aperture 95, such as for providing cushioning against a hand inserted into the aperture.

Countless packaging materials 100 (FIG. 15) may be used in accordance with the present disclosure to form any of the constructs and structures (e.g., tubes and bags) described above, with the substrate 102 and facing systems 104, 106 being selected to impart various properties to the resulting packaging material. By way of illustration, and not limitation, several exemplary packaging materials 200, 300, 400 are illustrated schematically in FIGS. 24-26. Each packaging material 200, 300, 400 generally includes a woven polymer substrate 202, 302, 402 and a respective pair of facing systems 104, 106; 204, 206; 304, 306, each of which may include a plurality of layers, as discussed above in connection with FIG. 15. For purposes of convenience, some layers of the packaging materials 200, 300, 400 may be described as "overlying" or being disposed "on" other layers. However, it will be appreciated that each packaging material 200, 300, 400 may be inverted, such that other layers may be said to "overlie" or be disposed "on" one another. Accordingly, such terminology is provided merely for convenience of explanation and not limitation in any manner.

It will also be appreciated that numerous other packaging materials are contemplated by the disclosure, and that each of such packaging materials may include various layers. Layers may be added or omitted as needed. It also will be appreciated that various materials may be used to form each layer of the packaging material, and that each layer may have various basis weights or coat weights and may be present in the packaging material in any suitable relative amount, depending on the particular application. Further, it will be appreciated that each layer may serve more than one purpose in a particular packaging material, and that the layer names are provided for convenience of explanation and not limitation in any manner.

Figure 24:
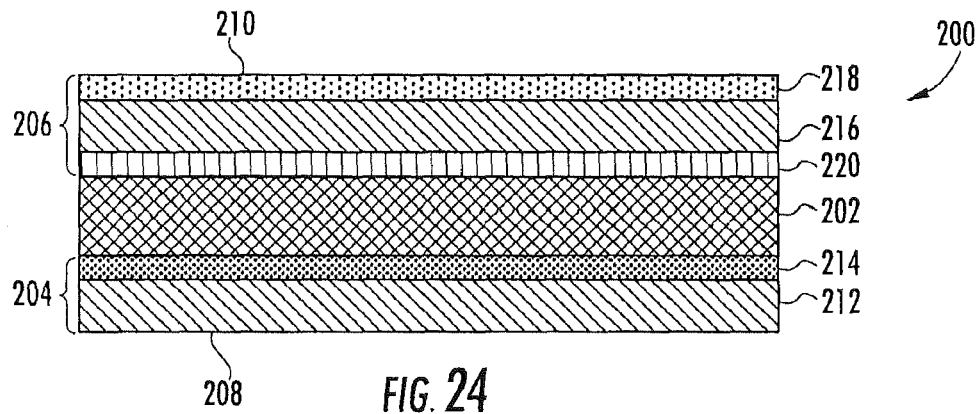
FIG. 24 is a schematic cross-sectional view of an exemplary packaging material in accordance with various aspects of the present disclosure.

Turning now to FIG. 24, a first exemplary packaging material 200 includes a woven polymer substrate 202, a first facing system 204 comprising a first polymer film layer 212 and a tie layer (e.g., a first tie layer) 214 disposed between the substrate 202 and the first polymer film layer 212, and a second facing system 206 comprising a second polymer film layer 216, which may be optionally printed with ink 218, and a tie layer (e.g., a second tie layer) 220 disposed between the substrate 202 and the second polymer film layer 216. Each layer 202, 212, 214, 216, 218, 220 is in a substantially facing, contacting relationship with the respective adjacent layer(s). Alternatively, in other embodiments, the second polymer film layer 216 may be reverse printed such that the ink 218 lies between the second polymer film layer 216 and the second tie layer 220.

When used to form a package, the first polymer film layer 212 (i.e., the outermost surface of the first polymer film layer 212) generally faces inwardly and/or defines the interior surface 208 of the tube, bag, package or the like, and the second polymer film layer 216 (i.e., the outermost surface of the second polymer film layer 216 and/or ink 218, where present) generally defines the exterior surface 210 of the tube, bag, package or the like. Accordingly, one or both polymer film layers 212, 216 may comprise heat sealable materials.

The substrate 202 generally comprises a base material from which the packaging material is formed. In one particular embodiment, the substrate 202 may comprise a woven polymer, for example, a woven polypropylene. The substrate 202 may have a denier of from about 600 to about 1200 dpf (denier per filament), for example, from about 700 to 1000 dpf, and in one example, the substrate 202 comprises a woven material having a denier of about 850 dpf. Likewise, the substrate 202 may have any suitable weave, for example, from about 8×8 to about 12×12, for example, about 10×10. In one particular example, the substrate 202 comprises a woven polypropylene having a denier of about 850 dpf and a 10×10 weave. One example of such a material is commercially available from Mayur Wovens Pvt., Ltd. (India). However, countless other deniers, ranges of deniers, weaves, ranges of weaves, and other substrates may be used.

The first polymer film layer 212 and the second polymer film layer 216 may be used to impart strength, water resistance, heat sealability, and/or other attributes to the packaging material 200. Where heat sealability is desired, one or both polymer films 212, 216 may generally comprise a thermoplastic polymer having a sufficiently low melting or softening point so the heat seal can be initiated at a relatively low temperature ("heat seal temperature"), for example, from about 180° F. to about 300° F. Additionally, the polymer may be selected to provide a wide hot tack sealing window, such that the heat seal may be formed over a range of temperatures with the degree of tackiness for the desired duration.

Examples of suitable polymers may include, for example, polypropylene (PP), for example, biaxially oriented polypropylene (BOPP) (e.g., BEM19 BOPP film, Vifan USA, Inc., Morristown, Tenn.), polyethylene terephthalate (PET), metallized polyethylene terephthalate, low density polyethylene (LDPE), poly(ethylene-co-methacrylic acid) (EMAA) (e.g., Surlyn® films available from DuPont, Wilmington, Del.), or any other suitable material.

The polymer film layers 212, 216 may generally have any suitable thickness (i.e., caliper), for example, from about 0.4 to about 1.5 mil, for example, from about 0.5 to about 1.2 mil. In one example, one or both polymer film layers 212, 216 may have a thickness of about 0.7 mil. In another example, one or both polymer film layers 212, 216 may have a thickness of about 1 mil. However, other suitable thicknesses and ranges of thicknesses are contemplated.

In one particular example, the first polymer film layer 212 may comprise low density polyethylene (LDPE). In one variation of this example, the first polymer film layer 212 may have a thickness of from about 0.5 to about 3 mil, for example, from about 0.8 to about 1.5 mil, for example, about 1 mil. However, other suitable materials are contemplated.

In another particular example, the second polymer film layer 216 may comprise biaxially oriented polypropylene (BOPP). In one variation of this example, the second polymer film layer 216 may have a thickness of from about 0.4 to about 1 mil, for example, from about 0.6 to about 0.8 mil, for example, about 0.7 mil. However, other suitable materials are contemplated.

In still another particular example, the first polymer film layer 212 may comprise LDPE having a thickness of from about 0.8 to about 1.5 mil, for example, about 1 mil, and the second polymer film layer 216 may comprise BOPP having a thickness of from about 0.4 to about 1 mil, for example, about 0.7 mil. However, numerous other configurations of layers are contemplated.

It will be appreciated that in an alternative embodiment, layers 212 and/or 216 may be used to provide strength and/or water resistance, while one or more other layers (not shown) may be provided for heat sealability. Countless possibilities are contemplated.

The tie layers 214, 220 generally serve to join two adjacent layers, but may have additional functionality if desired. In this example, tie layer 214 is generally operative for joining the first polymer film layer 212 and the substrate 202, and tie layer 220 is generally operative for joining the second polymer film layer 216 and the substrate 202.

Each tie layer 214, 220 may have any suitable composition and basis weight needed to attain the desired level of adhesion between the adjacent layers. For example, where the adjacent layers comprise PP (e.g., layers 202, 216), tie layer 220 may comprise PP. One example of a PP that may be suitable as a tie layer 220 is HMX 370 or HMX 340, commercially available from Chevron.

As another example, where the adjacent layers (e.g., layers 202, 212) comprise PP (e.g., layer 202) and LDPE (e.g., layer 212), the tie layer 214 may comprise a blend of polymers. The blend may include one or more components that provide adhesion to the substrate 202 and one or more components that provide adhesion to the first polymer film layer 212.

In one particular example, the blend may comprise a blend of linear low density polyethylene (LLDPE), for example, metallocene catalyzed LLPDE ("m-LLDPE") and LDPE. The present inventors have discovered that this exemplary blend provides superior processability and adhesive properties. One example of an LLDPE that may be suitable for use is Dow Affinity PT 1450G1 (Dow Chemical Co., Midland, Mich.) (believed to be m-LLDPE). While not wishing to be bound by theory, it is believed that Dow Affinity PT 1450G1 LLDPE may include one or more components that may enhance the adhesion with PP. One example of an LDPE that may be suitable is Chevron 1018 LDPE (Chevron Phillips Chemical Co. LLC, The Woodlands, Tex.). Other examples of LDPEs that may be suitable include, but are not limited to, Westlake EC-482 (Westlake Chemical Corp., Houston, Tex.) and Marflex® 1013 LDPE (Phillips Chemical Co. LLC, The Woodlands, Tex.).

The relative amounts of LLDPE (e.g., m-LLDPE) and LDPE in the tie layer 214 may vary for each application. The blend may generally comprise from about 70% to about 95%

LLDPE and about 5% to about 30% LDPE (by weight), for example, from about 80% to about 90% LLDPE and about 10% to about 20% LDPE. In one exemplary embodiment, the blend may comprise about 85% LLDPE and about 15% LDPE. However, other suitable amounts and ratios of LDPE and PP may be used.

In other embodiments, the tie layer 214 may comprise a blend of PP and LDPE. Numerous other possibilities are contemplated.

Each tie layer 214, 220 may have any suitable basis weight, for example, from about 1 to about 15 lb/ream, for example, from about 6 to about 10 lb/ream. In one specific example, one of the tie layers 214, 220 has a basis weight of about 8 lb/ream. In another example, both of the tie layers 214, 220 have a basis weight of from about 8 lb/ream. However, other basis weights and ranges of basis weights are contemplated.

Figure 25:
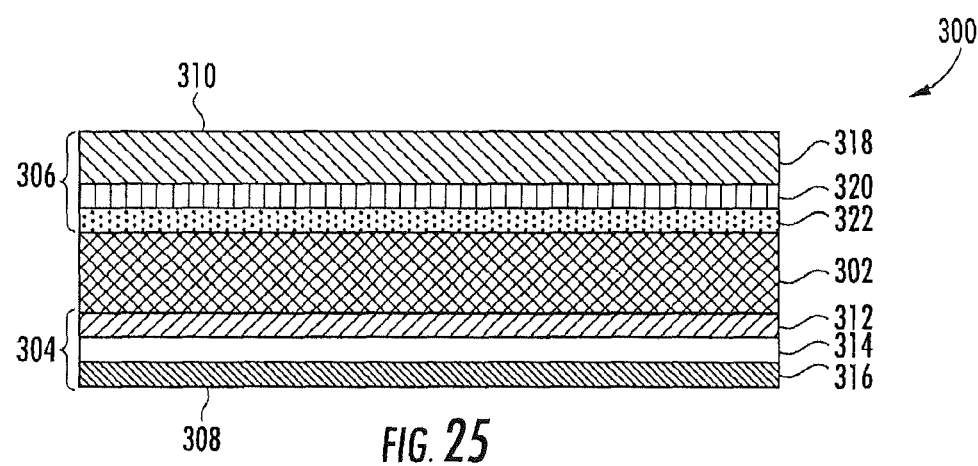
FIG. 25 is a schematic cross-sectional view of another exemplary packaging material in accordance with various aspects of the present disclosure.

FIG. 25 schematically illustrates another exemplary packaging material 300. The packaging material 300 includes a substrate 302 including a pair of opposed sides, a first facing system 304 including a tie layer 312 (e.g., a first tie layer), a core layer 314, and a heat seal layer 316 disposed on a first side of the substrate 302, and a second facing system 306 including a polymer film layer 318, which may optionally be printed with an ink 320, and a tie layer 322 (e.g., a second tie layer) disposed on a second side of the substrate 302. In an alternative embodiment (not shown), the polymer film layer 318 may include printing (i.e., ink 320) on the exterior surface 310 of the film 318.

Each layer or material 302, 312, 314, 316, 318, 320, 322 is in a substantially facing, contacting relationship with the respective adjacent layer(s) or material. When used to form a package, polymer film layer 318 (i.e., the outermost surface 310 of polymer film layer 318) generally faces outwardly and/or at least partially defines the exterior surface 310 of the tube, bag, package or the like, and heat seal layer 316 (i.e., the outermost surface 308 of heat seal layer 316) generally faces inwardly and/or defines the interior surface 308 of the tube, bag, package or the like.

The substrate 302 may be any suitable material, for example, the woven polymer materials described in connection with FIG. 24.

Layers 312, 314, 316 generally define a multifunctional polymer system 304. The polymer system 304 may be used to impart numerous properties to the packaging material 300. Thus, while the layers of the polymer system 304 may be described independently, it will be appreciated that the layers cooperate with one another to enhance the packaging material 300, as will be discussed below.

The heat seal layer 316 generally renders the interior side 308 of the packaging material 300 heat sealable. This may be desirable for numerous package configurations. The core layer 314 generally comprises a polymer layer, which may, if desired, impart various attributes to the packaging material 300. By way of example, and not limitation, the core layer 314 may serve as a barrier layer to oils (i.e., as an oil resistant layer). This may be important where the contents of the tube, bag, package or the like include a fatty or oily component, for example, as with pet food, bird seed, etc. The tie layer 312 generally joins the core layer 314 to the substrate 302. However, in some embodiments, the tie layer may be omitted, such that the core layer 314 also serves as a tie layer.

In some instances, the core layer 314 may be selected to have a melting point that is greater than the heat seal temperature to ensure that the integrity of the core layer 314 is maintained during the heat sealing process. In other instances, the core layer 314 may comprise a blend of materials, at least one of which may have a melting point less than the heat seal temperature. In such embodiments, the lower melting component(s) may soften during the heat sealing process, such that a portion of the core layer 314 serves as a heat seal material or layer in conjunction with heat seal layer 316. Thus, depending on the materials selected, each of the various layers 312, 314, 316 may cooperate in various ways to achieve a desired result.

In one exemplary embodiment, the heat seal layer 316 may comprise a blend of low density polyethylene (LLDPE), low density polyethylene (LDPE), and an ethylene/methacrylic acid copolymer (EMA). The LLDPE may be a metallocene LLDPE (m-LLDPE). The ratio of each component may vary for each application. In one example, the blend may comprise from about 60% to 100% LLDPE, from 0 to about 35% LDPE, and from 0 to about 5% EMA. In another example, the blend may comprise from about 60% to about 80% LLDPE, from about 15% to about 35% LDPE, and from about 1 to about 5% EMA. In still another example, the blend may comprise about 60% LLDPE, about 35% LDPE, and about 5% EMA, such that the ratio of the components is about 12:7:1. However, other blends of LLDPE, LDPE, and EMA are contemplated.

The present inventors have found that a blend of LLDPE, LDPE, and EMA offers superior processability and resulting heat seal strength. Specifically, the present inventors have found that by adding LLDPE to LDPE, the melting point (and, therefore, the heat seal temperature) is lowered from about 230° F. to about 220° F., and that by adding EMA to the mixture of LLDPE and LDPE, the melting point (and, therefore, the heat seal temperature) of the blend is lowered to about 210-215° F. As a result, the heat seal may be initiated at a lower temperature, which allows for the packaging material 300 to be heat sealed at greater processing speeds. The present inventors have also found that the heat seal formed from the blend of LLDPE, LDPE, and EMA has superior strength relative to a heat seal formed from any of the individual components.

While various LLPDEs, LDPEs, and EMAs may be used, one example of an LLDPE that may be suitable for use is Dow Affinity PT 1450G1 (Dow Chemical Co., Midland, Mich.) (believed to be m-LLDPE). While not wishing to be bound by theory, it is believed that Dow Affinity PT 1450G1 LLDPE may include one or more components that may enhance the affinity with PP. One example of an LDPE that may be suitable is Chevron 1018 LDPE (Chevron Phillips Chemical Co. LLC, The Woodlands, Tex.). Other examples of LDPEs that may be suitable are set forth above in connection with the discussion of the exemplary packaging material 200 of FIG. 24.

The heat seal layer 316 may have any suitable basis weight, for example, from about 1 to about 5 lb/ream, for example, from about 2 to about 4 lb/ream, for example, about 3 lb/ream. In one specific example, the heat seal layer 316 has a basis weight of about 3.06 lb/ream. However, other basis weights and ranges thereof are contemplated.

The tie layer 312 may be formed from any suitable material that sufficiently adheres to (and therefore joins) the adjacent layers. In one example, the tie layer 312 may comprise a blend of LLDPE, LDPE, and EMA, as described above. The ratio of each component may vary for each application. In one variation, the blend may comprise from about 60% to 100% LLDPE, from 0 to about 35% LDPE, and from 0 to about 5% EMA. In another variation, the blend may comprise from about 60% to about 80% LLDPE, from about 15% to about 35% LDPE, and from about 1 to about 5% EMA. In still another variation, the blend may comprise about 60% LLDPE, about 35% LDPE, and about 5% EMA, such that the ratio of the components is about 12:7:1. Other blends of LLDPE, LDPE, and EMA are contemplated.

The present inventors have discovered that this exemplary blend provides superior processability and adhesive properties with a variety of substrates. By way of illustration, and not limitation, it is known that it is difficult to adhere various polymers layers to polypropylene (PP) (e.g., in the substrate 302) at high processing speeds. However, the exemplary blend of LLDPE, LDPE, and EMA, which has a relatively low melting point (about 210-215° F. as compared with about 350° F. for PP), tends to flow readily into the spaces between the woven filaments, even at high processing speeds (e.g., 2000-2500 ft/min). Additionally, where Dow Affinity 1450G1 LLPDE is used, the present inventors have found that the tie layer 312 has a greater affinity for core layers including PP (e.g., core layer 314), as compared with other LLDPEs. As stated above, while not wishing to be bound by theory, it is believed that the Dow Affinity 1450G1 LLDPE includes one or more components that enhance the affinity of the LLPDE to PP.

The tie layer 312 may have any suitable basis weight, for example, from about 0.5 to about 5 lb/ream, for example, from about 0.75 to about 2 lb/ream, for example, about 1 lb/ream. In one specific example, the tie layer 312 has a basis weight of about 1.19 lb/ream. Other ranges and basis weights are contemplated.

In one exemplary embodiment, the core layer 314 may comprise a blend of PP and LDPE. The relative amounts of PP and LDPE in the core layer 314 may vary for each application. The blend may generally comprise from about 70% to about 90% PP and about 10% to about 30% LDPE. In each of various examples, the blend may comprise about 75% PP and about 25% LDPE, about 80% PP and about 20% LDPE, or about 85% PP and about 15% LDPE. However, other suitable amounts and ratios of LDPE and PP may be used.

The present inventors have discovered these exemplary blends of PP and LDPE in the core layer 314 provide an excellent balance of properties for various packaging materials. For example, as compared with a core layer 314 comprising only PP (i.e., without the LDPE), a core layer 314 including from about 80 to about 85% PP and about 15 to 20% LDPE (by weight) provides about the same level of oil resistance as a core layer 314 comprising 100% PP. Further, the presence of the LDPE improves adhesion with the adjacent layers. By way of example, where the heat seal layer 316 and/or the tie layer 312 comprise a blend of LLDPE, LDPE, and EMA (e.g., as discussed above), the blend of LDPE and PP in the core layer 314 has a greater affinity for the polymer blend of the heat seal layer 316 and/or the tie layer 312, as compared with PP alone.

Further, since LDPE has a lower melting point than PP (about 230° F. for LDPE and about 320° F. for PP), in some cases, depending on the heat seal temperature and other processing conditions, the LDPE in the core layer 314 and the tie layer 312 may soften during the heat sealing process, such that a part of the core layer 314 and tie layer 312 also effectively serves as part of the heat seal layer 316. In such cases, the basis weight of the heat seal layer 316 and/or the tie layer 312 may be reduced, thereby reducing the cost of the overall structure.

By way of illustration, the present inventors have found that a packaging material including:

a heat seal layer 316 having a basis weight of about 1.3 lb/ream and comprising a blend of about 60% LLDPE, about 35% LDPE, and about 5% EMA (by weight);

a core layer 314 having a basis weight of about 3.33 lb/ream and comprising an 80/20 blend of PP/LDPE; and a tie layer 312 having a basis weight of about 0.37 lb/ream and comprising a blend of about 60% LLDPE, about 35% LDPE, and about 5% EMA, exhibited better peel strength (i.e., layer to layer adhesion) than a packaging material including:

a heat seal layer 316 having a basis weight of about 3.12 lb/ream and comprising a blend of about 60% LLDPE, about 35% LDPE, and about 5% EMA;

a core layer 314 having a basis weight of about 4 lb/ream and comprising PP; and a tie layer 312 having a basis weight of about 0.88 lb/ream and comprising a blend of about 60% LLDPE, about 35% LDPE, and about 5% EMA.

Thus, although each polymer system 304 had about the same basis weight (about 5 lb/ream), the packaging material including the blend of LDPE and PP in the core layer 314 exhibited superior peel strength at a reduced cost (based on the present cost of various polymers in each layer). While not wishing to be bound by theory, it is believed that this is because the presence of the LDPE in the core layer contributed to the overall heat sealability of the material, as discussed above.

The core layer 314 may generally have a basis weight of from about 1 to about 8 lb/ream, for example, from about 2 to about 6 lb/ream, for example, about 4 lb/ream. In one specific example, the basis weight of the core layer 314 may be about 3.75 lb/ream. Other ranges and basis weights are contemplated.

The polymer system 304 (i.e., the heat seal layer 316, core layer 314, and tie layer 312) may have any suitable total basis weight. In each of various examples, the polymer system 304 may have a basis weight of about 5 lb/ream, about 5.5 lb/ream, about 6 lb/ream, about 6.5 lb/ream, about 7 lb/ream, about 7.5 lb/ream, about 8 lb/ream, about 8.5 lb/ream, about 9 lb/ream, about 9.5 lb/ream, about 10 lb/ream, about 10.5 lb/ream, about 11 lb/ream, about 11.5 lb/ream, about 12 lb/ream, about 12.5 lb/ream, about 13 lb/ream, about 13.5 lb/ream, about 14 lb/ream, about 14.5 lb/ream, about 15 lb/ream, or any other suitable basis weight.

Further, the components of the polymer system 304 may be present in any suitable ratio. In one example, the weight % ratio of the heat seal layer 316, core layer 314, and tie layer 312 may be about 3.06:3.15:1. However, other ratios are contemplated.

In one example, the heat seal layer 316 may have a basis weight of from about 1 to about 5 lb/ream, the core layer 314 may have a basis weight of from about 1 to about 8 lb/ream, and the tie layer 312 may have a basis weight of from about 0.5 to about 5 lb/ream.

In another example, the heat seal layer 316 may have a basis weight of from about 2 to about 4 lb/ream, the core layer 314 may have a basis weight of from about 2 to about 6 lb/ream, and the tie layer 312 may have a basis weight of from about 0.75 to about 2 lb/ream. In one particular example, the heat seal layer 316 may have a basis weight of about 3 lb/ream, the core layer 314 may have a basis weight of about 4 lb/ream, and the tie layer 312 may have a basis weight of about 1 lb/ream. In another particular example, the heat seal layer 316 may have a basis weight of about 3.06 lb/ream, the core layer 314 may have a basis weight of about 3.75, and the tie layer 312 may have a basis weight of about 1.19 lb/ream.

The polymer film layer 318 may be used to impart strength, water resistance, heat sealability, and/or other attributes to the packaging material 300. Where heat sealability is desired, the polymer film 318 may generally comprise a thermoplastic polymer having a sufficiently low melting or softening point so the heat seal can be initiated at a relatively low temperature ("heat seal temperature"), for example, from about 180° F. to about 300° F., as discussed above in connection with polymer film layers 212, 216 of FIG. 24. Examples of polymers that may be suitable for the polymer film layer 318 are also discussed in connection with polymer film layers 212, 216 of FIG. 24.

The polymer film layer 318 may have any suitable thickness (i.e., caliper) of, for example, from about 0.4 to about 1.5 mil, for example, from about 0.5 to about 1.2 mil. In one example, the film may have a thickness of about 0.7 mil. However, other suitable thicknesses and ranges of thicknesses are contemplated.

In one particular example, the polymer film layer 318 may comprise biaxially oriented polypropylene (BOPP). In one variation of this example, the polymer film layer 318 may have a thickness of from about 0.4 to about 1 mil, for example, from about 0.6 to about 0.8 mil. In one variation of this example, the polymer film layer 318 may have a thickness of about 0.7 mil. However, other suitable materials are contemplated.

The tie layer 322 generally serves to join the two adjacent layers, in this example, the polymer film layer 318 and the substrate 302, but may provide functionality if desired. The tie layer 322 may have any suitable composition and basis weight as needed to attain the desired level of adhesion between the adjacent layers. In one particular example, the blend may comprise a blend of linear low density polyethylene (LLDPE), for example, metallocene catalyzed LLPDE ("m-LLDPE") and LDPE. The present inventors have discovered that this exemplary blend provides superior processability and adhesive properties. One example of an LLDPE that may be suitable for use is Dow Affinity PT 1450G1 (Dow Chemical Co., Midland, Mich.) (believed to be m-LLDPE). While not wishing to be bound by theory, it is believed that Dow Affinity PT 1450G1 LLDPE may include one or more components that may enhance the adhesion with PP. One example of an LDPE that may be suitable is Chevron 1018 LDPE (Chevron Phillips Chemical Co. LLC, The Woodlands, Tex.), Other examples of LDPEs that may be suitable include, but are not limited to, Westlake EC-482 (Westlake Chemical Corp., Houston, Tex.) and Marflex® 1013 LDPE (Phillips Chemical Co. LLC, The Woodlands, Tex.). However, numerous other possible tie layers are contemplated.

The relative amounts of LLDPE (e.g., m-LLDPE) and LDPE in the tie layer 322 may vary for each application. The blend may generally comprise from about 70% to about 95% LLDPE and about 5% to about 30% LDPE (by weight), for example, from about 80% to about 90% LLDPE and about 10% to about 20% LDPE. In one exemplary embodiment, the blend may comprise about 85% LLDPE and about 15% LDPE. However, other suitable amounts and ratios of LDPE and PP may be used.

The tie layer 322 may have any suitable basis weight, for example, from about 1 to about 15 lb/ream, for example, from about 6 to about 10 lb/ream. In one specific example, the tie layer 322 has a basis weight of about 8 lb/ream. However, other basis weights and ranges of basis weights are contemplated.

Figure 26:
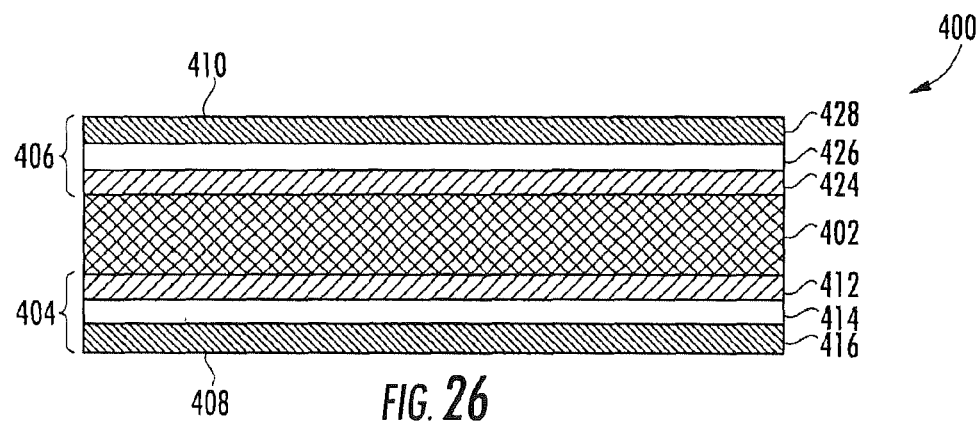
FIG. 26 is a schematic cross-sectional view of still another exemplary packaging material in accordance with various aspects of the present disclosure.

FIG. 26 schematically illustrates an alternate packaging material 400. The packaging material 400 includes features that are similar to the packaging material 300 of FIG. 25, except for variations noted and variations that will be understood by those of skill in the art. For simplicity, the reference numerals of similar features are preceded in the figures with a "4" instead of a "3".

In this example, layers 318, 320, 322 of the packaging material 300 of FIG. 25 are replaced with a polymer system 406 similar to that of polymer system 404. Specifically, the packaging material 400 includes a substrate 402 including a pair of opposed sides, a first tie layer 412, a first core layer 414, and a first heat seal layer 416 disposed on a first side of the substrate 402, and a second tie layer 424, a second core layer 426, and a second heat seal layer 428 disposed on a second side of the substrate 402, such that the arrangement of layers is generally symmetrical. If desired, the outermost surface 408, 410 of layers 416 and/or 428 may be printed with ink (not shown).

Each pair of layers (e.g., the first and second heat seal layers 416, 418, the first and second core layers 414, 426, and the first and second tie layers 412, 424) independently may have the same or different composition and/or weight. Exemplary basis weights are provided above with respect to the packaging material 300 of FIG. 25.

As with the packaging material 300 of FIG. 25, either or both of layers 412, 424 may be omitted, such that layers 414, 426 serve as tie layers that join the heat seal layers 416, 428 to the respective sides of the substrate 402.

While numerous possibilities are contemplated, this packaging material 400 may find particular use where less strength is needed and/or where a lower cost alternative is desired.

In still another exemplary embodiment (not shown), one or both of the facing systems may comprise a layer of paper that defines the first and/or second surface of the packaging material. It will be appreciated that shear seals and/or other seals may be formed from such materials using a hot melt adhesive or other adhesive material. Numerous other possibilities are contemplated.

Various aspects of the present invention are illustrated further by the following example, which is not to be construed as limiting in any manner.

EXAMPLE 1

A packaging material having the following structure was made by extrusion laminating the polymer film layers to the woven substrate:
- about 0.7 mil BOPP film;
- about 8 lb/ream PP;
- about 850 dpf 10×10 woven PP substrate;
- about 8 lb/ream blend of 80% Dow Affinity m-LLDPE+ 20% LDPE;
- about 1 mil LDPE film Various properties of the packaging material were measured. The results are set forth in Table 1, in which all values are approximate.

TABLE 1

| | |
|---|---|
| Weight (lb/ream) | 66.2 |
| Caliper (mils) | 7.69 |

TABLE 1-continued

| Grease resistance | No grease penetration |
|---|---|
| Oxygen transmission rate (OTR) (cc/m$^2$/day) | 16.01 |
| Water vapor transmission rate (WVTR) (100 g/m$^2$/day) | 0.105 |
| Puncture (g) | Would not puncture |
| Gurley stiffness, MD | 132.6 |
| Gurley stiffness, CD | 137.9 |
| Tear, MD (g) | Would not tear |
| Tear, CD (g) | Would not tear |
| Tensile, MD (lb/in) | Would not break |
| Tensile, CD (lb/in) | Would not break |

All directional references (e.g., upper, lower, upward, downward, left, right, leftward, rightward, top, bottom, above, below, vertical, horizontal, upstream and downstream) are used in the Detailed Description section of this disclosure only for identification purposes to aid the reader's understanding of the various embodiments, and do not create limitations, particularly as to the position, orientation, or use of the invention unless specifically set forth in the following claims.

It will be understood by those skilled in the art that while the present disclosure has been discussed above with reference to several embodiments, various additions, modifications and changes can be made thereto without departing from the spirit and scope of the invention as set forth in the claims.

What is claimed is:

1. A method for sealing an upper end of a preformed tube, comprising:
    transporting the preformed tube in a downstream direction along a path, wherein the preformed tube has opposite first and second sides that each extend between the upper end of the preformed tube and an opposite lower end of the performed tube, the first side of the preformed tube includes a first outer portion of the preformed tube and a second outer portion of the preformed tube, and the second side of the preformed tube includes a third outer portion of the performed tube and a fourth outer portion of the preformed tube;
    folding the preformed tube during the transporting of the preformed tube in the downstream direction along the path, wherein the folding of the preformed tube comprises moving the first and third outer portions of the preformed tube downwardly relative to the second and fourth outer portions of the preformed tube and, thereby, folding over the upper end of the preformed tube over a heat supplying apparatus into a folded-over configuration in which
        the first and second outer portions of the preformed tube are facing toward one another with the heat supplying apparatus disposed between the first outer portion and the second outer portion, and
        the third and fourth outer portions of the preformed tube are facing away from one another;
    causing heat to be transferred with respect to at least the first outer portion of the preformed tube and the second outer portion of the preformed tube with at least the heat supplying apparatus during the transporting of the preformed tube in the downstream direction along the path; and
    then nipping at least the first, second, third and fourth outer portions of the preformed tube during the transporting of the preformed tube in the downstream direction along the path.

2. The method of claim 1, wherein the preformed tube comprises a woven polymer material.

3. The method of claim 1, wherein the causing of the heat to be transferred with respect to at least the first outer portion and the second outer portion of the preformed tube comprises:
    forcing air onto at least the first outer portion and the second outer portion of the preformed tube through the heat supply apparatus, so that forced convection causes heat transfer with at least the first outer portion and the second outer portion of the preformed tube.

4. The method of claim 3, further comprising forcing air onto the fourth outer portion of the preformed tube while transporting the preformed tube so that heat is transferred away from the fourth outer portion of the preformed tube by way of forced convection.

5. The method of claim 4, further comprising cooling the air before the air is discharged onto the fourth outer portion of the preformed tube.

6. The method of claim 4, wherein the heat supply apparatus is a downstream heat supply apparatus, and the method further comprises discharging hot air onto the first outer portion of the preformed tube through an upstream heat supply apparatus during the transporting of the preformed tube in the downstream direction along the path.

7. The method of claim 3, further comprising causing heated air to flow onto the third outer portion of the preformed tube while transporting the preformed tube so that heat is transferred to the third outer portion of the preformed tube by way of forced convection.

8. The method of claim 1, wherein the folding over the upper end of the preformed tube over the heat supply apparatus comprises folding at least the first outer portion of the preformed tube with respect to the second outer portion of the preformed tube with an upstream diverter and then further folding at least the first outer portion of the preformed tube with respect to the second outer portion of the preformed tube with a downstream diverter, the downstream diverter at least partially covering the heat supply apparatus.

9. The method of claim 1, wherein the transporting the preformed tube in the downstream direction along the path comprises moving the preformed tube along a guide rail, and the causing heat to be transferred with respect to at least the first outer portion of the preformed tube and the second outer portion of the preformed tube with at least the heat supplying apparatus comprises discharging air from the heat supply apparatus through an opening in the guide rail onto the second outer portion of the preformed tube.

10. A method for sealing a preformed tube, comprising:
    transporting the preformed tube in a downstream direction along a path;
    folding the preformed tube over a heat supply apparatus so that the heat supply apparatus is disposed between a first outer portion of the preformed tube and a second outer portion of the preformed tube during at least a portion of the transporting of the preformed tube in the downstream direction along the path;
    causing forced convective heat transfer with the first outer portion of the preformed tube through at least the heat supply apparatus during the transporting of the preformed tube in the downstream direction along the path;
    causing forced convective heat transfer with the second outer portion of the preformed tube through at least the heat supply apparatus during the transporting of the preformed tube in the downstream direction along the path, wherein the first and second outer portions of the preformed tube are opposite from one another; and then nipping at least the first and second outer portions of the preformed tube during the transporting of the preformed tube in the downstream direction along the path.

11. The method of claim 10, wherein the preformed tube comprises a woven polymer material.

12. The method of claim 10, wherein:
the causing of the forced convective heat transfer with the first outer portion of the preformed tube comprises causing the air to flow in a first direction onto the first outer portion of the preformed tube;
the causing of the forced convective heat transfer with the second outer portion of the preformed tube comprises causing the air to flow in a second direction onto the second outer portion of the preformed tube; and
the first and second directions are opposite from one another.

13. The method of claim 10, further comprising causing forced convective heat transfer with a fourth outer portion of the preformed tube during the transporting of the preformed tube in the downstream direction along the path comprising causing air to flow onto the fourth outer portion of the preformed tube while transporting the preformed tube so that heat is transferred away from the fourth outer portion of the preformed tube by way of forced convection.

14. The method of claim 13, further comprising cooling the air before the air is discharged onto the fourth outer portion of the preformed tube.

15. The method of claim 12, wherein air flowing in the first direction onto the first outer portion is heated air and air flowing in the second direction onto the second outer portion is heated air.

16. The method of claim 15, further comprising causing forced convective heat transfer with a third outer portion of the preformed tube during the transporting of the preformed tube in the downstream direction comprising causing heated air to flow onto the third outer portion of the preformed tube while transporting the preformed tube.

17. The method of claim 10, wherein the folding the performed tube over the heat supply apparatus comprises folding at least the first outer portion of the preformed tube with respect to the second outer portion of the preformed tube with an upstream diverter and then further folding at least the first outer portion of the preformed tube with respect to the second outer portion of the preformed tube with a downstream diverter, the downstream diverter at least partially covering the heat supply apparatus.

18. The method of claim 10, wherein the transporting the preformed tube in the downstream direction along the path comprises moving the preformed tube along a guide rail, and the causing forced convective heat transfer with the second outer portion of the preformed tube through at least the heat supply apparatus comprises discharging air from the heat supply apparatus through an opening in the guide rail onto the second outer portion of the preformed tube.

* * * * *